US009262885B2

(12) United States Patent
Moore et al.

(10) Patent No.: US 9,262,885 B2
(45) Date of Patent: Feb. 16, 2016

(54) METHODS AND SYSTEMS FOR FACILITATING TABLE GAMES

(75) Inventors: Stephen Moore, Las Vegas, NV (US); Brian Besterman, South Salem, NY (US); Jeff Bischoff, Stamford, CT (US)

(73) Assignee: Walker Digital Table Systems, LLC, Las Vegas, NV (US)

( * ) Notice: Subject to any disclaimer, the term of this patent is extended or adjusted under 35 U.S.C. 154(b) by 158 days.

(21) Appl. No.: 13/513,994

(22) PCT Filed: Jun. 7, 2011

(86) PCT No.: PCT/US2011/039483
§ 371 (c)(1),
(2), (4) Date: Jun. 5, 2012

(87) PCT Pub. No.: WO2011/156401
PCT Pub. Date: Dec. 15, 2011

(65) Prior Publication Data

US 2012/0252564 A1 Oct. 4, 2012

Related U.S. Application Data

(60) Provisional application No. 61/352,366, filed on Jun. 7, 2010.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC .......... *G07F 17/322* (2013.01); *G07F 17/3237* (2013.01)

(58) Field of Classification Search
CPC ........................... G07F 17/322; G07F 17/3248
USPC ........................................................... 463/25
See application file for complete search history.

(56) References Cited

U.S. PATENT DOCUMENTS

| | | | |
|---|---|---|---|
| 4,814,589 | A | 3/1989 | Storch |
| 5,248,142 | A | 9/1993 | Breeding |
| 5,265,882 | A | 11/1993 | Malek |
| 5,275,416 | A | 1/1994 | Schorr et al. |
| 5,280,915 | A | 1/1994 | Groussman |

(Continued)

FOREIGN PATENT DOCUMENTS

| | | |
|---|---|---|
| AU | 2007231813 | 11/2008 |
| JP | 2005342175 | 12/2005 |

OTHER PUBLICATIONS

Supplemental European Search Report for European Application No. 08730031 dated Jun. 29, 2012, 7 pp.

(Continued)

*Primary Examiner* — Kevin Y Kim
(74) *Attorney, Agent, or Firm* — Fincham Downs, LLC; Magdalena M. Fincham, Esq.

(57) ABSTRACT

A gaming table provides for use of RFID technology to track chip movement on a table game and to infer an association between a wager and a player position based on a chip identifier of a chip placed on a particular position of the table. In some embodiments, previous position history of the chip is also taken into account in determining a player position associated with a wager.

19 Claims, 7 Drawing Sheets

(56) References Cited

U.S. PATENT DOCUMENTS

| | | | | |
|---|---|---|---|---|
| 5,283,422 | A | 2/1994 | Storch | |
| 5,367,148 | A | 11/1994 | Storch | |
| 5,390,934 | A | 2/1995 | Grassa | |
| 5,511,781 | A | 4/1996 | Wood et al. | |
| 5,544,393 | A | 8/1996 | Lightfoot | |
| 5,566,946 | A | 10/1996 | Parker | |
| 5,615,888 | A | 4/1997 | Lofink et al. | |
| 5,651,548 | A | 7/1997 | French et al. | |
| 5,735,742 | A * | 4/1998 | French | 463/25 |
| 5,806,846 | A | 9/1998 | Lofink et al. | |
| 5,816,575 | A | 10/1998 | Keller | |
| 5,947,822 | A | 9/1999 | Weiss | |
| 6,019,374 | A | 2/2000 | Breeding | |
| 6,186,895 | B1 | 2/2001 | Oliver et al. | |
| 6,217,447 | B1 | 4/2001 | Lofink et al. | |
| 6,227,969 | B1 | 5/2001 | Yoseloff | |
| 6,341,778 | B1 | 1/2002 | Lee | |
| 6,371,867 | B1 | 4/2002 | Webb | |
| 6,454,266 | B1 | 9/2002 | Breeding et al. | |
| 6,598,879 | B2 | 7/2003 | Spur et al. | |
| 6,619,662 | B2 | 9/2003 | Miller | |
| 6,679,492 | B2 | 1/2004 | Markowiak | |
| 6,679,497 | B2 | 1/2004 | Walker et al. | |
| 6,726,564 | B2 | 4/2004 | Hogan et al. | |
| 6,749,200 | B2 | 6/2004 | Yurkins | |
| 6,855,051 | B1 | 2/2005 | Mostashari | |
| 6,877,746 | B1 | 4/2005 | Herren et al. | |
| 6,929,264 | B2 | 8/2005 | Huard et al. | |
| 7,093,833 | B1 | 8/2006 | Horning | |
| 7,144,011 | B2 | 12/2006 | Asher | |
| 7,255,351 | B2 | 8/2007 | Yoseloff et al. | |
| 7,654,532 | B2 | 2/2010 | Feola | |
| 7,722,047 | B2 | 5/2010 | Walker et al. | |
| 7,852,223 | B2 | 12/2010 | Hecht et al. | |
| 7,922,587 | B2 | 4/2011 | Chun | |
| 2002/0002072 | A1 | 1/2002 | Sines et al. | |
| 2002/0027322 | A1 | 3/2002 | Breeding | |
| 2003/0195043 | A1 | 10/2003 | Shinners et al. | |
| 2004/0207156 | A1 | 10/2004 | Soltys et al. | |
| 2005/0143157 | A1 | 6/2005 | Stelzer et al. | |
| 2006/0046853 | A1 | 3/2006 | Black | |
| 2006/0258442 | A1 * | 11/2006 | Ryan | 463/29 |
| 2006/0281537 | A1 | 12/2006 | Abbott et al. | |
| 2007/0032283 | A1 | 2/2007 | Chun | |
| 2007/0281786 | A1 | 12/2007 | Kuhn et al. | |
| 2007/0293303 | A1 * | 12/2007 | Shayesteh | 463/25 |
| 2008/0076529 | A1 * | 3/2008 | Richards et al. | 463/25 |
| 2008/0113772 | A1 | 5/2008 | Burrill et al. | |
| 2008/0230993 | A1 | 9/2008 | Chun | |
| 2009/0267742 | A1 | 10/2009 | Hecht et al. | |
| 2010/0062845 | A1 | 3/2010 | Wadds et al. | |
| 2010/0093428 | A1 | 4/2010 | Mattice | |
| 2010/0113118 | A1 | 5/2010 | Shigeta | |
| 2012/0080845 | A1 * | 4/2012 | Emori et al. | 273/309 |

OTHER PUBLICATIONS

U.S. Appl. No. 13/042,633 entitled a Betting Terminal and System filed Mar. 8, 2011, 23 pp.

Australian Patent Examination Report No. 1 for Application No. 201165034 dated Sep. 17, 2013, 3 pp.

Singapore Intellectual Property Office Written Opinion for Application No. 201205094-4 dated Jul. 10, 2013, 5 pp.

Chinese Intellectual Patent Office Action and Search Report for Application No. 20080012338.1 dated Aug. 5, 2013, 11 pp.

European Search Report for Application No. 08730031.5 dated Apr. 11, 2013, 7 pp.

Singapore Intellectual Property Office Search Report for Application No. 201201042.7 dated Jul. 16, 2013, 6 pp.

Office Action for U.S. Appl. No. 12/092,548 dated Jul. 3, 2013, 13 pp.

Office Action for U.S. Appl. No. 12/255,222 dated Mar. 7, 2012, 15 pp.

Office Action for U.S. Appl. No. 12/092,548 dated Dec. 6, 2012, 12 pp.

Australian Patent Examination Report for Australian Patent Application No. 2012202968 dated Jan. 11, 2013, 6 pp.

International Search Report for PCT Patent Application No. PCT/US08/54146 dated Jul. 14, 2008, 2 pp.

Written Opinion for for PCT Patent Application No. PCT/US08/54146 dated Jul. 14, 2008, 6 pp.

Office Action for U.S. Appl. No. 12/255,222 mailed Sep. 23, 2011, 13 pp.

Office Action for U.S. Appl. No. 12/255,222 mailed Mar. 7, 2012, 15 pp.

Office Action for U.S. Appl. No. 12/255,222 mailed May 10, 2012, 15 pp.

Office Action for U.S. Appl. No. 12/092,548 mailed May 10, 2012, 7 pp.

Office Action for U.S. Appl. No. 12/092,548 mailed Nov. 21, 2011, 7 pp.

Office Action for U.S. Appl. No. 12/092,548 mailed Mar. 18, 2011, 12 pp.

PCT International Search Report for PCT Application No. PCT/US2011/039483 mailed Oct. 20, 2011, 2 pp.

Written Opinion for PCT Application No. PCT/US2011/039483 mailed Oct. 20, 2011, 8 pp.

Australian Patent Examination Report for Application No. 2013203651 dated May 2, 2014; 5 pps.

Response to Examiner's Report for Application No. 2013203651 dated Oct. 21, 2014; 24 pps.

Office Action for Chinese Application No. 201180017957.1 dated May 28, 2014; 14 pps.

Office Action for Chinese Application No. 201180017957.1 dated Feb. 10, 2015; 6 pps.

Written Opinion for Singapore Application No. 201205094-4 dated Aug. 23, 2013; 9 pps.

Response to Written Opinion for Singapore Application No. 201205094-4 dated Jan. 6, 2014; 12 pps.

Singapore Examiners Response for Application No. 201205094-4 dated Jul. 2, 2014; 9 pps.

Office Action for U.S. Appl. No. 12/092,548, filed Aug. 21, 2008 dated Mar. 27, 2014; 16 pps.

Examiner's Report for Singapore Patent Application No. 2012010427 dated Jun. 20, 2014; 9 pps.

Examination Report for Patent Application No. 2012202968 dated Nov. 26, 2013; 3 pps.

Notice of Acceptance for Patent Application No. 2012202968 dated Feb. 13, 2014; 2 pps.

Office Action for U.S. Appl. No. 13/513,994, filed Jun. 5, 2012 dated Mar. 24, 2014; 13 pps.

Office Action for U.S. Appl. No. 13/513,994, filed Jun. 5, 2012 dated Jul. 1, 2014; 12 pps.

Examination Report for Singapore Application No. 2012050944 dated Mar. 18, 2014; 7 pps.

Certificate of Grant for Australian Patent No. 2013203651 dated Mar. 26, 2015.

Certificate of Grant for Singapore Patent No. 182454 dated Feb. 24, 2015.

Certificate of Invention Patent for Chinese Patent No. ZL 200880012338.1 dated Apr. 14, 2015.

Office Action for European Application No. 08730031.5 dated Apr. 10, 2015 7 pps.

* cited by examiner

METHODS AND SYSTEMS FOR FACILITATING TABLE GAMES

RELATED APPLICATIONS

The present application claims priority to and the benefit of International Application No. PCT/US1139483, filed Jun. 7, 2011 and entitled "METHODS AND SYSTEMS FOR FACILITATING TABLE GAMES", which claims priority to U.S. Provisional Application Ser. No. 61/352,366 filed Jun. 7, 2010 in the name of Moore et al. and titled SYSTEMS AND METHODS FOR BACCARAT AND BLACKJACK. Each of the above applications is incorporated by reference in its entirety.

The present application is related to the following applications (A) through (D), the entirety of each of which is incorporated by reference herein:

(A) U.S. patent application Ser. No. 12/255,222 filed Oct. 21, 2008 in the name of Walker et al. and titled RE-CHARACTERIZATION OF BETS AT TABLE GAMES ("the '222 Application" herein), which claims the benefit and priority of the following provisional applications:

1. U.S. Provisional Patent Application Ser. No. 60/990,165, filed Nov. 26, 2007;
2. U.S. Provisional Patent Application Ser. No. 61/014,299, filed Dec. 17, 2007;
3. U.S. Provisional Patent Application Ser. No. 61/020,470, filed Jan. 11, 2008;

(B) PCT patent application No. PCT/US0854146, filed Feb. 15, 2008, the entirety of which is hereby incorporated by reference, and which claims the benefit of and priority to the following provisional patent applications:

1. U.S. Provisional Patent Application Ser. No. 61/024,827, filed Jan. 30, 2008, entitled Recharacterization of Bets at Table Games;
2. U.S. Provisional Patent Application Ser. No. 61/023,290, filed Jan. 24, 2008, entitled Recharacterization of Bets at Table Games;
3. U.S. Provisional Patent Application Ser. No. 61/020,470, filed Jan. 11, 2008, entitled Method and Apparatus for Playing Baccarat with Late Play Options;
4. U.S. Provisional Patent Application Ser. No. 61/012,230, filed Dec. 7, 2007, entitled Table Game Session Play
5. U.S. Provisional Patent Application Ser. No. 60/943,171, filed Jun. 11, 2007, entitled Blackjack Session Play;
6. U.S. Provisional Patent Application Ser. No. 60/890,328, filed Feb. 16, 2007, entitled Systems and Method for Conducting Casino Games;
7. U.S. Provisional Patent Application Ser. No. 61/028,555, filed Feb. 14, 2008, entitled Proposition Bets for Baccarat and Other Games;

(C) PCT patent application Serial No. PCT/US0779518, filed Sep. 26, 2007; and (D) U.S. patent application Ser. No. 11/735,231, filed Apr. 13, 2007, entitled Incremental Revelation of Results in a Game of Chance.

FIELD OF THE INVENTION

The present invention is directed facilitating betting options and tracking of activity at table games.

DETAILED DESCRIPTION OF THE INVENTION

Figure 1:
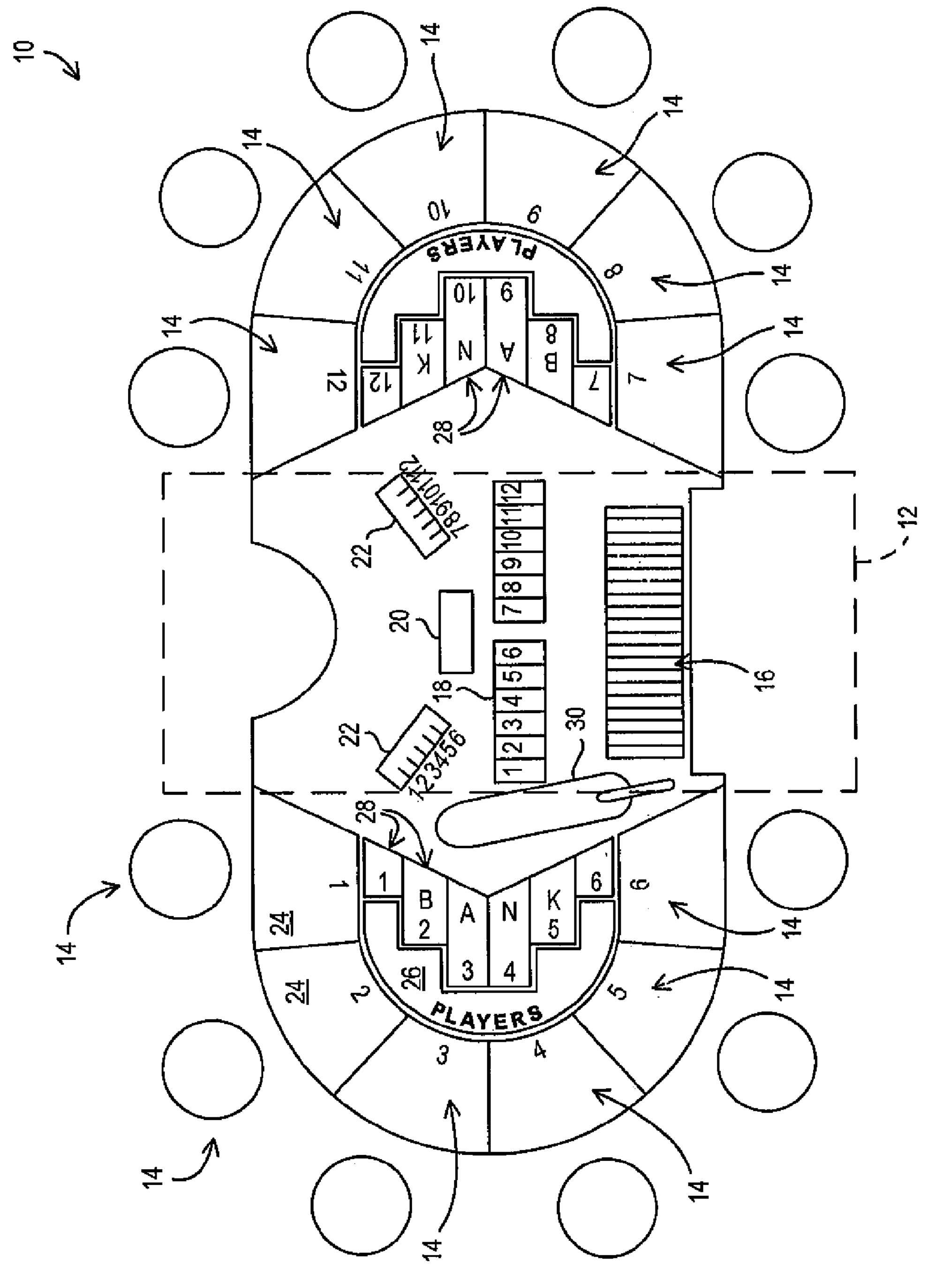
FIG. 1 PRIOR ART
FIG. 1 illustrates a top planar view of a traditional baccarat table.

Described herein are systems, processes and articles of manufacture which provide for facilitating wagering activity on an RFID-enabled table (e.g., wagering activity in a baccarat, blackjack or roulette game). In accordance with some embodiments, systems, processes and articles of manufacture provide for associating a particular RFID-enabled chip with a particular player position of the table and tracking the movement and wagering activity associated with the chip throughout game play. In accordance with some embodiments, the recognition and/or tracking of the chip movement allows for a determination of a player's wagering decisions throughout the game, as well as payouts due to the player or losses incurred by the player. In accordance with some embodiments, a system is provided which includes a table having a plurality of antennas or interrogators placed thereon, for use in recognizing the placement of an RFID-enabled chip on one or more positions of the table.

In accordance with some embodiments, a table comprising shared or common wagering positions is provided. In such embodiments, wagers made by or on behalf of any of a plurality of players may be placed by placing one or more RFID-enabled chips on such a shared or common wagering position. However, the player position (e.g., and thus the player) associated with a particular wager composed of one or more uniquely identified RFID-enabled chips that is placed on such a common or shared position may be inferred based on a prior placement of the one or more chips.

In accordance with some embodiments, bet re-characterizations may be effectuated after initial cards are dealt for a game, either by use of tokens or by tracking the placement or movement of one or more RFID-enabled chips on the table and, in some embodiments, a respective prior position history associated with one or more of the chips.

In previously-filed Application '222, Applicants described various embodiments which allow for wagering opportunities through the use of a concept termed herein "bet re-characterization" as well as other bets such as "late" bets and "side" bets. As described in Application '222, a re-characterization bet is a bet that occurs when, after a player places an initial bet within a game, the player is afforded the opportunity to change the criterion by which the initial bet is determined to be a winning bet or a losing bet. In exchange for the right to make this change, the house may increase the house advantage for the re-characterized bet. A late bet is also a bet that takes place after at least one initial card has been dealt, but prior to the final resolution of a given hand or round of play.

Given the variety and number of re-characterization bets contemplated by the present disclosure in conjunction with the physical limitations of size and space a gaming table may be allowed to occupy, Applicants have recognized that in some cases, it may be beneficial to provide for common or "shared" betting areas. That is, rather than associating or providing a plurality of physical betting areas for each individual player seated at the gaming table, it may be beneficial to instead offer one or more common betting areas (e.g., each associated with a given wager type), accessible to or usable for a plurality of players.

As described herein, in some embodiments, player wagers placed upon such areas of the gaming table may be identified and/or associated with respective player(s) having placed such wagers via one or more RFID sensors incorporated into the layout of the table itself. In one embodiment, a player desiring to place such a wager may indicate his interest in doing so (e.g. audibly, via a hand signal) to the dealer. Thereafter, the dealer may place physical chips representing the player's wager on a first dedicated area of the gaming table associated with the player, the first dedicated area being associated with an RFID sensor. The RFID sensor then transmits an indication of the wager amount and associated player (or player position) to the table computer (or an interrogator on the table determines, recognizes, senses or detects the presence of the RFID-enabled chips in an area of the table associated with the player, including unique identifiers of each of the chips, and transmits such information to a processor of the table), which then stores data associated with the wager. Thereafter, the dealer (and/or player) may move the chips representing the player's wager to a second "shared" area of the gaming table, which may be associated with a second RFID sensor. Upon resolution of a game instance associated with the wager (e.g. upon completion of a hand of baccarat), an outcome associated with the wager is determined (e.g. win/loss) along with any corresponding payout that may be entitled to the player. If the player is entitled to a payout, the dealer may then place chips representing such payout on the second dedicated area of the table. The payout is recorded by the table computer via the second RFID sensor. The original wager and payout may then be placed on the first dedicated are (associated with the first RFID sensor), serving to thereby record an indication of the payout having been provided to the associated player.

An example using baccarat is illustrative. In baccarat, a bettor places an initial wager on either the player hand or the banker hand, depending on which hand the bettor thinks will win. The bettor, for this example, bets on the player station. The dealer deals two cards (e.g., two-jack) to the player station and two cards (e.g., four-ace) to the banker position to form an intermediate result (e.g., the player has a 2 and the banker has a 5) short of a final resolution of the game instance. That is, the rules of the game dictate that, in this circumstance additional cards are to be drawn by one or both hands. Based on the cards currently shown, the bettor decides to re-characterize her bet such that the bet is no longer a bet on the player station winning. In particular, daunted by the odds of beating a dealer five, the player re-characterizes her bet so that the changed bet is that the player station hand will include a pair (either two jacks or two twos) upon final resolution of the game instance. The bettor places a re-characterization token on the stack of chips representing her wager (e.g., the token might be labeled "Pair"). By re-characterizing the wager, the bettor replaces the original wager with the re-characterized wager. The game is then resolved upon the player station receiving a hit card (e.g., a four, for a total of 6). Under this fact pattern, the banker also takes a hit (e.g., a nine, for a total of 4). Normally, bettors betting on the player station would win because the player score (6) beats the banker score (4). However, because the bettor had re-characterized her bet into a pair bet, the bettor loses. Assume instead that the player drew a 2, for a total of 4. The banker stands on his five since the player draw card was a two. Normally, the bettor would lose a bet on the player station, but because the bettor had re-characterized her bet to have a pair, the bettor would win.

While the pair bet is but one form of bet re-characterization, there are numerous other events, stages, and/or states within the game by which the player may be offered and/or elect to re-characterize her bet. Note also that in this example, the re-characterized bet supersedes the original bet. There are other forms of bet re-characterization discussed in greater detail below such as where the re-characterization bet subsumes the original bet, or splits into a partial original bet and a new bet. As yet another alternative, instead of a re-characterized bet, the new bet may be offered as a side bet or second bet. In any of these situations, the odds may be adjusted to give the house a more favorable house advantage, a less favorable house advantage, or maintain the normal house advantage as desired.

Various systems may be deployed to provide bet re-characterization and several examples are provided herein. The present disclosure will focus on baccarat as an example, but it should be appreciated that bet re-characterization may be applied to other table games such as blackjack, roulette, craps, Sic Bo, Pai Gow (tile and poker variations), LET IT RIDE™, CARIBBEAN STUD™, 3-CARD POKER, 4-CARD POKER, SPANISH 21, variants of such games (e.g., Chemin de Fer), or the like.

The rules of baccarat are well understood, but the interested reader is directed to www.wizardofodds.com/baccarat for a more detailed explanation. Turning now to FIG. 1, illustrated therein is a traditional baccarat table 10 with a dealer station 12 and a plurality of player stations 14. A brief overview of how traditional baccarat is played is provided herein with reference to FIG. 1, as a reference for readers unfamiliar with the game of baccarat, since a good understanding of the traditional rules of baccarat as well as a layout of a traditional baccarat table may be helpful in understanding some of the embodiments described herein. The dealer station 12 is sized to accommodate two dealers, one on either side. Many "high roller" style baccarat tables actually have three dealers present, and the dealer station 12 may provide room for the number of dealers assigned to the table. The dealer station 12 is shown to include a chip rack 16, as well as commission indicia 18, bank hand area 20, and tie bet indicia 22. The chip rack 16 is sized to accommodate chips and plaques as is well understood. The commission indicia 18 allow the house to keep a record of any commissions that the player may owe for betting on the banker hand. Players usually settle the commission at the end of the shoe and/or before leaving the table so as to minimize disruption of game play. As illustrated, commission indicia 18 are divided into boxes for each player station. The banker hand area 20 is the place to which the cards forming the banker hand are dealt. The tie bet indicia 22 are the locations on the table where a player may indicate a wager on a tie between the banker hand and the player hand. Again, the tie bet indicia 22 are divided so that there is a box for each player station. While the tie bet indicia 22 may conceptually be thought of as part of the player stations 14, the positioning of the tie bet indicia 22 in the center of the table makes it impractical for a player to position a wager therein, so in most instances, the dealer will position such a wager, and thus, for the purposes of the present disclosure, the tie bet indicia 22 are included within the dealer station 12. While not illustrated in FIG. 1, some baccarat tables have display panels that indicate recent historical outcomes. Players sometimes use such historical outcomes in an effort to predict trends within a series of game instances.

Each player station 14 includes a chip area 24 where the player may position her chips. A player bet area 26 exists in front of each chip area 24. As illustrated, the player bet area 26 is not specifically delimited for each player station, but such indicia are sometimes present. Additionally, each player station 14 includes a bank bet area 28 with appropriate indicia to link wagers placed therein to a particular player station 14. The dealers may use a shoe (not shown) to hold cards and a paddle or wand 30 to move cards and/or chips to particular locations on the table 10 as is well understood.

It should be noted that the term "token" is used herein to denote one mechanism via which a re-characterization bet may be placed (other embodiments which provide for placement of a re-characterization wager without the use of any tokens are also described). While illustrated as something that looks like a chip or coin, it should be understood, that as used herein, the term "token" is defined to be a physical element capable of indicating a bet re-characterization (e.g., a physical chip bearing indicia corresponding to a particular bet re-characterization). Specifically included within the definition of token are chips, coins, markers, lammers, buttons, cards (perhaps uniquely marked), dice, tickets, or other paper substrate, a ring, a bowl, a chip tray or sleeve, a chip clip, and charms. The indicia may be textual, graphical, color-coded, or the like. For example, a blue button may denote a first type of bet re-characterization and a red button a second type of bet re-characterization. Color codes could be published and understood by the public in much the same manner that chip color codes denote value and are understood by the public (e.g., green=twenty-five dollars). More esoteric tokens are described in greater detail in the alternate embodiment section below. Various embodiments of using tokens to re-characterize bets are described in the Application '222 and such embodiments are particularly incorporated by reference herein.

Various methodologies and mechanisms for providing tokens and/or restricting their availability and/or use are described the '222 Application and this aspect of that application is particularly incorporated by reference herein.

Types of Re-Characterization Bets

There are many different ways bets may be re-characterized. As used herein, "re-characterize" and "re-characterization" are generic terms that encompass the various ways in which initial bets may be changed into new or altered bets. Within the definition of re-characterization, there may be considered to be three distinct embodiments.

The first embodiment is a re-characterization bet that supersedes the initial wager. If a re-characterization bet supersedes the initial wager, then the entirety of the initial wager becomes the new wager. There is no portion of the initial wager left. Likewise, the new wager is for the same amount of value as the initial wager.

The second embodiment is a re-characterization bet that subsumes the initial wager. If a re-characterization bet subsumes the initial wager, then the entirety of the initial wager becomes part of the new wager. There is no portion of the initial wager left. However, additional value is added to the initial wager such that the new wager is for an amount greater than the initial wager. Note that the additional value can come in the form of additional chips (e.g., a player increases her wager from $100 to $200) or from adding a bet re-characterization token 32 that has value (e.g., a player paid $10 for a token 32 and adds it to the initial $100 wager resulting in an effective wager of $110).

The third embodiment is a re-characterization bet that splits the initial wager into a re-characterized portion and a diminished remaining portion. For example, the player may make an initial wager of five hundred dollars on the banker position, and then re-characterize the initial wager by splitting the initial wager into a two hundred dollar wager on a pair and a three hundred dollar diminished initial wager on the banker position. The ratio of the split may be dictated by the re-characterization or by the player as desired. For example, some re-characterization bets may require a fifty-fifty split between the re-characterized portion and the diminished initial portion, others may require a seventy-thirty split or some other ratio, and still others may leave it to the player to decide how to split the initial wager. Note that for split bets, in some embodiments, two tokens may be used. The first token is put on the re-characterized portion as previously described, and the second token is put on the diminished initial portion and may state that the diminished initial portion is paid out at normal odds (e.g., the token indicates "even money" or "normal odds"). The two tokens may help reduce confusion by players that think both wagers are paid at the new odds and by dealers who may need to pay each stack of chips at different odds.

In contrast to a re-characterized bet, some of the bets described herein may also be implemented as side bets, second or "late" bets, or proposition bets. While there is a substantial body of literature on such bets, the concepts are distinct. Side bets differ from the concept of a re-characterized bet in that side bets keep the initial wager intact and add the side bet. For example, in THREE-CARD POKER, there is the ante bet (the initial wager) and the pair-plus wager (the side wager). Each wager is distinct and does not affect the other. Late bets may be thought of as side bets that occur after an initial wager has been placed (e.g., during an intermediate stage of a game); however, these are additional bets, and do not re-characterize the initial wager. Likewise, some of the bets described herein may be implemented as a proposition bet (commonly, a bet with somewhat long odds that may be placed without an accompanying base game wager). Again, the concepts are distinct. A proposition bet does not rely on any pre-existing initial wager that is re-characterized. Rather, the proposition bet is a standalone bet on a particular event such as a hard way eight in craps. It should be noted that while most of the discussion below focuses on re-characterized bets, the present disclosure is not limited to re-characterized bets, and the techniques described herein may readily be extended to such proposition, side, and/or late bets.

Figure 2:
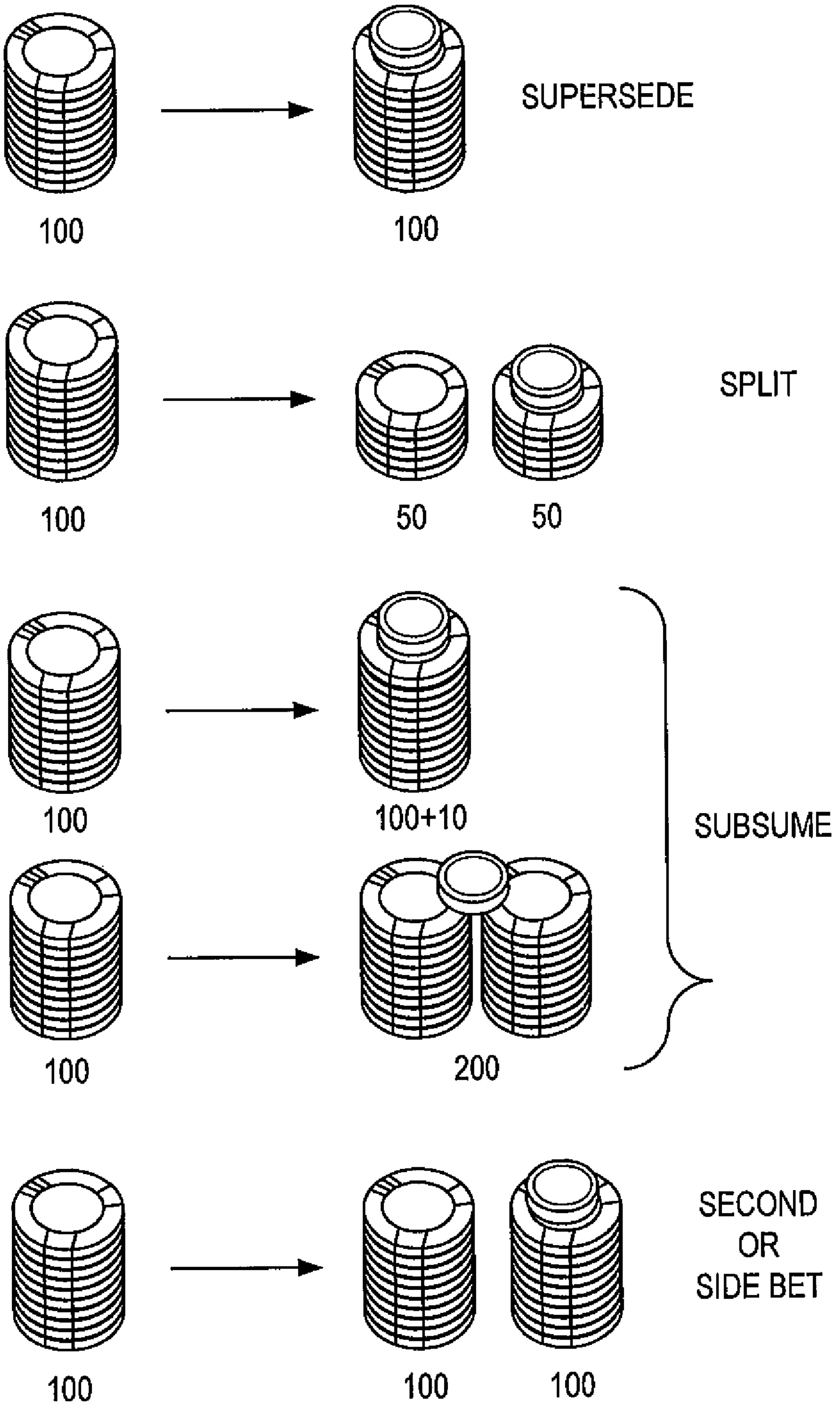
FIG. 2 illustrates, in accordance with some embodiments, the various species of re-characterization bets that are described herein.

A summary of the various definitional distinctions is presented in FIG. 2. What follows is a list of various particularly contemplated types of bet re-characterizations and other wagers suitable for use on the tables of the present disclosure. Note that many of the different types may be implemented as supersede re-characterizations, subsume re-characterizations, or split re-characterizations.

"Hedge"—Player places a hedge bet on the position not initially selected, sort of like an insurance bet. Ex: a player places an initial wager on the banker position, but the deal is player 9-4, banker Q-7. The player may place a hedge bet on the player side. The hit card is a 5, resulting in a player hand win of 8:7. The original wager loses, but the hedge bet on the player hand wins.

"Win by X"—Ex: A player places a "Win by Two" token, his original bet must now win by a margin of at least two. If it does, he may be paid at a higher rate. Any margin amount may be substituted for X. Outcomes of a tie or push may result in a loss of the player's bet. In one example embodiment, a player re-characterize to bet "Win Big," meaning his bet pays an adjusted amount if the player wins by a margin of 2, 3 or 4 (in some embodiments all other wins are losses or pay at less than even money). In another example embodiment, a player may bet "Win Giant," meaning his bet pays an adjusted amount if the player wins by a margin of 4, 5, 6, 7, 8 or 9 (in some embodiments all other wins are losses or pay at less than even money).

"Roll Over"/"Next Hand"/"Pass"—Ex: When a player places a "Roll Over" token, his original bet is "pushed forward" or moved to a subsequent hand. In one example, the player may also be required to post an additional minimum bet on the subsequent hand to do this. In other words, the player might "rescue" a disadvantaged original bet from Hand #1 and push it forward to Hand #2, but he must also agree to post a separate minimum bet on Hand #2. The player may be given a choice as to whether the bet for Hand #2 is on the player hand or the banker hand. If the original bet from Hand #1 wins on Hand #2, it pays at lesser odds (e.g., dynamically calculated based on the first four cards dealt in Hand #1). In one embodiment, the bet for the second hand must be at least equal in amount to the bet for the first hand. In other embodiments, an additional minimum bet on Hand #2 may not be required; instead, by playing a "Next Hand" token, a bet form Hand #1 is simply pushed forward to Hand #2 where it pays at lesser, adjusted odds if it wins. As yet another option, the players could demur on a first hand in exchange for premium odds or other benefits payable in a second (or subsequent or multiple subsequent) hand. For example, a player could accept a "next hand" wager on a favorable six and pay no commissions on the next two hands.

"Two (or more) in a Row"—Ex: A bettor wagers $100 on "banker". After the initial deal, it becomes clear that the banker side is ahead, 8-2. The bettor then places a "Two in a Row" token. The bettor must now win this hand as well as the subsequent hand. If he does, he is paid at better odds (e.g., the calculation considers the odds of winning the first hand given the first four cards, as well as the odds of winning the second hand, and a house edge). In one embodiment, the bet for the second hand must be at least equal in amount to the bet for the first hand, though a new bet for the second hand may not be required. In a variation of this, a player could bet that he will lose two or more hands in a row. In another variation, the player can bet that he will win at least a predetermined amount of hands over the course of two or more hands.

"9 Insurance"—Ex: A bettor places a bet on "banker" in baccarat. After the first four cards are dealt, the banker is ahead, 7 to 5. The player places a "9 Insurance" token. If the bettor wins, his original bet is paid at a lesser rate (e.g., dynamically calculated based on the first four cards dealt). If the bettor loses to a "9" (the "player" position draws a "4"), his bet pushes. Thus, the insurance protects players from losing to a "9". In variations, bettors might be protected from opposing outcomes other than "9". For example, insurance might protect against any loss by a margin of 1 (a "bad beat"). In another example, insurance might protect any loss. In one embodiment, a player insures his bet by paying a dynamically-priced premium (based on the cards in play and the player's original bet). In yet another example, insurance may protect against natural, such that a player may get his bet returned if he loses to a natural (and/or, in some embodiments, may get paid less on all other wins). In still another example, insurance may protect against a hand not improving, such that a player who places such an insurance bet is paid an insurance payout if, after two cards have been dealt, a third dealt card lowers the value of the hand.

"Add 2"/"Extra Points"—A player of a baccarat game can indicate that he or she would like to "purchase" extra points at any time towards the hand he or she has wagered upon. For example, after the first four cards have been dealt, two to the Player Hand and two to the Banker Hand, the Player has "4" and the Banker has "6". Bettor A wagering on the Player Hand may then indicate (e.g., by use of a token) that he or she wants two points (or another number of points, as this embodiment is not limited to a particular number of points) added to the Player Hand total. The hand is then resolved, however when bets are settled, Bettor A's wager is settled based on the final total of the Player hand +2 and the final total of the Banker hand. In some embodiments, a player may have the option to "deduct" or subtract points from one of the hands on the table. If the bettor is putting himself in a worse position, he or she may be given a benefit (e.g., a bonus, a higher payout, advantageous rule change, etc.). In some embodiments, points can always be added to a hand unless they give the player a Natural. A player with a "7" cannot use a +2 chip because it results in a natural. In some embodiments, points are not added if the hand results in a natural without the added points (e.g., the Player hand results in a "9", even for a bettor that has used a +2, the hand total is still 9 (the +2 is ignored on specified predetermined totals)). In some embodiments, points are always added regardless of the outcome (e.g., the Player hand results in a "9", but a bettor that has used a +2 now has a "1"). In some embodiments, regardless of what the next/hit card is, the points are added to the hand. In some embodiments, the traditional hit rules apply to those who have used the "extra point" option. For example, normally, the Player Hand hits on anything less than a five and stands on 6 or above. If the Player Hand has a "4" and chooses to add 2, resulting in a "6", then the hit does not apply (e.g., the Player Hand becomes pat for that specific player). The same rules may be used if the player has wagered on Banker. For example, the Player Hand totals "4" and the Banker Hand totals "4". Bettor A uses a +2 option for the Banker hand resulting in a "6" and the Player Hand then draws a "4". The Dealer deals another card for the Banker, but it does not apply when settling Bettor A's wager according to the hit rules in baccarat.

"Press"/"Raise"—Ex: By using a "Press" token, a bettor can increase his bet mid-way through a hand. For example, after the first four cards of a baccarat hand are dealt, the bettor can place a token and increase (e.g., double) his bet. Both his original bet and the late bet may be paid at an adjusted rate (e.g., dynamically calculated based on the first four cards dealt) thus resulting in a re-characterization of the initial wager. In other embodiments, only the added amount may pay at an adjusted rate. In one embodiment, the total payoff for both the original wager and late bet may be paid at an adjusted rate, though by subtracting some payout for the late bet amount, the player may be given the illusion that the original wager is paid at even money (e.g., the player bets $10, and then uses a "Raise" option to add $100; the adjusted payout considers the entire $110 bet and pays $87.50; when paying this amount, the dealer pays the original bet an even $10, and pays the late bet $77.50). In one embodiment, there may be a limit to the amount of money which a player may bet through such a re-characterization, though this may not be necessary if a high enough house edge is used (the house's appetite for risk exposure increases with the house edge, as the house is happy to book even extremely large bets at a high house edge). In some embodiments, this maximum bet amount may be dynamically determined (e.g., based on factors such as the player's profile, the house's financial predicament in a given month, etc). "Switch"—Ex: After betting on "banker," a bettor decides mid-way through a baccarat hand he would rather bet on "player". The bettor places a "Switch"

token and the player's bet switches sides. The bet is paid at an adjusted rate (e.g., dynamically calculated based on the first four cards dealt). For example, after the initial value of the player and banker position cards is determined, the player may be offered the ability to alter his wager from a given side to the other (e.g. from banker to player), albeit at non-standard odds. In such cases, the odds and/or payouts offered may be determined (e.g. by the table computer) based on the initial hand values, probabilities associated with the hand values and/or based on the composition of cards previously and/or yet to be dealt (e.g. based on cards remaining in the shoe).

"Split (to Tie)"—Ex: After betting $100 on "player," a baccarat bettor decides he'd like to take some of his original bet and place it on another outcome. For example, the bettor takes $25 from the base bet, and adds a "Split to Tie" token on top. Thus, his original bet has now been split between two outcomes—the $75 base bet pays 1:1 if "player" wins, and the $25 bet pays at an adjusted rate should a tie occur (e.g., dynamically calculated based on the first four cards dealt).

As described, this is an example of a split re-characterization. A player can "split" to various outcomes other than "Tie" in this manner. Further, in some embodiments, when players want to re-characterize only a portion of their initial wager, they may use a "Split," "Divide" or "Half" token. A "Half" token might indicate that a given re-characterization applies only to half of an original wager. Half tokens may be used in combination with other tokens (e.g., a player placing "Half" and "Win by Two" tokens means he is re-characterizing half of his base bet to an outcome of "Win by Two"). Half tokens may be "smart" or incorporate RFID technology. In some embodiments, the re-characterized portion and the portion remaining on the original bet may have different associated house edge values (e.g., the original bet stays at 1.2% while the re-characterized portion pays an adjusted amount based on the re-characterization, the cards in play, and a larger house edge value). In other embodiments, re-characterizing a portion of an original wager may also affect the house edge of the non-re-characterized portion. Note that "splitting" or dividing a wager amount is separate from a re-characterization that splits a single two-card hand into two separate one-card hands (described below).

"Multi-Split"—A player can divide his original wager into multiple portions, each betting on a different outcome. For example, a player might divide his bet into three portions, one portion representing 50% of the original wager, and two 25% portions. The 50% portion may remain on the original wager (e.g., Player or Banker in baccarat), and pay at predetermined odds. One 25% portion may be re-characterized to "Big Win" and the other 25% portion may be re-characterized to "Giant Win," each paying at different adjusted rates. Of course, players may subdivide their original bet into any number of re-characterizations (not just 2 or 3), other percentages may be used (e.g., three portions of 33%), any or all portions need not be equal, and players may split into numerous different types of re-characterizations described herein (not just "Big Win" and "Giant Win").

Card-Matching Bets—Ex: A player of a baccarat game may place a wager on a card-matching outcome involving cards in play. For example, the outcome may use cards from both hands, sometimes including the hit cards as well. Exemplary matching outcomes that may be wagered on via re-characterization include: four of a kind (e.g., any four of the same value card, or four cards of a specific value, such as four eights), straight, flush, full house, straight flush, cards of the same color, or the like.

"Any Pair"/"Late Pair"—Ex: After the initial deal, the bettor can bet that his hand includes a pair (if it does not already, or if it does, perhaps he can bet that his hand will include three matching cards). If the hand in question includes a pair after the draw, the player is paid at adjusted odds (based at least in part on the post-deal expected value (EV) of his original bet and the likelihood of achieving a pair).

"Perfect Late Pair"—Ex: Same as "Late Pair," except cards must be a perfect match, and pays at longer odds.

"Tie-Breaker"/"Win or Tie"—Ex: A player may use an option that breaks any possible ties. For example, if the player has chosen to have a tie-breaker, the player is paid if the hand wagered on wins the hand OR on a tie, and the wager is collected if the hand loses.

"Draw to '9'"—Ex: After a player has seen a partial deal, the player may make a wager that the final total of his or her hand will be a predetermined number (e.g., the first two Player Cards total 5, a player may indicate or wager that the hit will bring the final to total to "9").

"Deny the Hit"/"Two-Card Hand"—Ex: A player may choose not to have one or more dealt cards count towards the final outcome. For instance, the first card dealt to Player is a "7". At this point, a player may indicate that any other cards dealt to the Player hand do not count (i.e., he or she locks the "7" as the player hand total).

"Take Down"—Ex: A player may be able to rescue a losing wager by pulling back all or a portion of a wager. For example, by playing a "Take Down" token, a player in a disadvantageous situation can remove half of his original bet, with the remaining half paying an adjusted payout upon win.

"Sure Thing"/"Instant Win"/"Settle"—Ex: After betting $500 on "player," a baccarat bettor sees after the first four cards are dealt that his bet is at an advantage (e.g., he is ahead 7-3). Rather than risk losing the bet to a bad beat, the bettor places an "Instant Win" token. This token settles the bet for its Expected Value (EV), minus a house edge (though the amount subtracted from the EV may consider other factors, such as player status). This "locks in" the player's win.

"Free 6"—bettor can request a "Free 6" in baccarat after seeing the initial deal. Ties may result in a push, or may result in the bettor's loss. Wins are paid at an adjusted rate. For example, the player might select "Banker" and "Quick 6," giving the banker side a starting or final hand value of 6 (hit cards may or may not be applied). In baccarat, the predetermined hand value may or may not apply to other players betting on the same side. In exchange for taking the "Quick 6," the player may agree to a reduced payout (e.g., if he wins, he gets paid 2:3), or an offsetting, disadvantageous rule change (e.g., ties lose). Of course, similarly, prior to the deal, a bettor can request that he'd like a hand of any predetermined value, such as a 7 (i.e., this type of bet is not limited to a 6 or any particular value).

"10 is a 2"—Ex: After the initial deal, the bettor can play a "10 is a 2" token and turn all 10-value cards (e.g., face cards or 10s) for the side he has bet on into a "2". Any card value can be changed to any other card value with this mechanic. Wins are paid at an adjusted rate. This change in card value may be personal to the player requesting it in some embodiments. In other embodiments, the change in card value may apply to the whole table. "Pushes Lose"/"Ties Lose"/"No Tie"—Ex: After the initial deal, the bettor can play a "Pushes Lose" token. If he wins, he is paid at better odds. If he ties, his bet is lost. In other words, in some embodiments a player may bet that a tie will not occur. If a tie is indeed absent, the player may receive a payout for his wager at greater than 1:1 odds (e.g., his bet may pay 6:5 or even 3:2). However, if a tie occurs, the player may lose his bet. For example, the player bets $100 on "Banker" and places a green "No Tie" token on top of his wager or upon a dedicated area of the gaming table. A tie does not occur and the Banker side wins. The player is paid $120 for his $100 bet.

"Pushes Win"/"Ties Win"—Ex: After the initial deal, the bettor can play a "Ties Win" token. If his hand ties or exceeds the opposing hand, his bet wins, but is paid at an adjusted rate. For example, an outcome of "Tie" results in a player winning his bet (e.g., at a payout of 1:1). If the bettor wins outright (e.g., places $100 on "Banker" and the "Banker" side wins, 7-6), he may be paid at less than even money (e.g., 4:5). "Hop Bets" (e.g., 9-0)—Ex: After the initial deal, the bettor can bet that the current hand will resolve to a particular point score on both sides (e.g., 9-0). The bet can be re-characterized to wager on any such specific score, or range of scores. Each would pay at its own adjusted odds. In one embodiment, the bettor may be paid at odds better than 1:1 if the score comes up (e.g., 4:1 or even as high as 10:1), but accept payouts lesser than 1:1 (e.g., 4:5) if he otherwise wins. In another embodiment, the bet may only win if the specific score comes up, and otherwise loses.

"Long Shot"—Ex: After the initial deal, the table can calculate the "longest shot" in terms of point score on both sides, and offer this bet. Players can re-characterize and bet only on this long-shot, which pays at high odds.

"Win Two Ways"—Ex: After the initial deal, the bettor plays a "Win Two Ways" token. First, the side he originally chose must win according to standard baccarat rules. However, the same side must also win according to a cumulative count of the card values in each hand (e.g., 5-7-3 is a "15" by this count, in contrast to being counted as a "5" in standard baccarat rules). If the bettor wins both of these, he is paid at adjusted odds. Winning only one of the two ways is not enough, and the bettor loses his bet.

"Freeze"—Ex: in some situations, a player may be dealt a preferable hand, but because of the strict draw rules in baccarat, the hand ends early. For example, a deal with a Player hand of 6 and a Banker hand of 7 ends after the deal. In such a situation, a player may place a "freeze" token to allow her wager or hand total to roll into the next hand. For example, a player bets on Player and the initial deal is 7-7. The player places a freeze token on his wager which carries the player total of 7 into the next hand. The player's payout is rated in the next hand and she may be required to add additional value to the wager.

"Alternate Draw"/"Reach Back"—Ex: in some situations wherein a draw does not usually occur, a player may wish to force a draw. Wins may be paid at an adjusted rate. The extra card may come from the shoe, a previous hand, an electronic random number generator, or other source as desired.

"Split"/"Form Two Hands"—Ex: as is common in blackjack, a player may be able to split a two-card baccarat hand into separate hands, and play each separately against the opposing hand.

"No Zero"/"No Four"—Ex: a bettor wagers that his hand will not be of a certain final value, such as 0 or 4. In some embodiments, an outcome of the specified value of the bet results in a loss, even if it normally would have resulted in a tie or win. In some embodiments, other wins result in a higher adjusted payout in exchange for this penalty (e.g., 6:5).

"No 10s/Specific Values on a Side are Automatic Losses"—The bettor wagers that the side he has bet on will not include a card with a value of 10 (10, J, Q, K). If it does include a 10 and he wins, he may either lose his bet or be paid at less than even money. If it does include a 10 and he loses, the player loses his bet. If it does not include a 10 and he wins, he wins greater than even money. If it does not include a 10 and he loses, he may be paid less than even money.

"All Red or All Black"—If the bettor's cards are all red or black, he may be paid a bonus payout. For this benefit, he may accept lesser payouts on normal wins or an offsetting negative rule change. In another embodiment, the bettor must win with all red or black cards to win his bet, but it pays more than even money (e.g., 10:1).

"Even or Odd"—In one embodiment, the player must win with all even or odd cards to win his bet, but it pays more than even money (e.g., 10:1). In another embodiment, the player must win with a hand value that is even or odd.

"Win with a Pair"—The bettor must win, and his hand must include a pair of cards.

"Triple Delight"—If the bettor's hand includes three cards of the same value (e.g., 6♣ 6♠ 64), he is paid a large payout. In exchange, he accepts slightly less than even money if he wins without having three cards of the same value.

"Lead and Win"—If the bettor's hand is of greater value than the opposing hand 1) after the first two cards have been dealt, and 2) after any draw cards are applied to the hands, he wins a payout at greater than even money (e.g., 3:1). In exchange, he might give up ties (ties lose), or accept less than even money on wins.

"Super 8"—The player places a bet on "Super 8". The bet in imprisoned until the player loses, or achieves an 8. Each time the player wins without a hand value of 8, the bet is paid 1:1, but it is imprisoned and "rides" until the next hand. If the player loses, the full accumulated amount is taken by the house. If the player hits an "8," the entire stack is multiplied by a factor, such as 3:2 or 3:1. Thus, the player stands to win a lot of money if he hits an 8 before losing.

"Three Way Win"—The player bets that his first card will beat the opposing hand's first card, his second card will be the opposing hand's second card, and that his total score will beat the opposing hand's total score.

"Strong Start"—The player bets that his side will be ahead after the first four cards are dealt.

"Get Close"—Ex: A bet is re-characterized such that a player wins if he/she gets "within 1" or "within 2," on either side of the opposing hand (or perhaps only the negative side).

"Two Losses"—Ex: Same as "Two in a Row," except bettor wagers that he will lose.

"Big Loss"/"Giant Loss"—Ex: Same as "Big Win"/"Giant Win," except bettor wagers that he will lose by the given margin.

"Win Win Plus"—Ex: The bettor bets that he will win the current hand, as well as the next hand. The second hand must be won by a greater margin than the first.

"Win by More"/"Improved Win"—Ex: If the bettor is up 2-0, and he plays a "Win by More" token, he must win the hand by a margin of 3 or more (more than the margin after an initial deal).

"Bet on Next Card"/"Monkey Hit"—Ex: The bettor can abandon his original wager and instead wager that the next card is a particular rank and/or suit (e.g., the next card has a value of "10").

"20 to 1"—Ex: For any given hand, a different re-characterization might pay 20:1, though the exact re-characterization required to pay this amount might change from hand to hand. The player simply places a "20 to 1" token or places his bet in a "20 to 1" circle and accepts whatever re-characterization is required.

"Best of Two Hands"—Ex: A baccarat bettor wagers on banker and is behind 0-4 after the first four cards are dealt. He chooses to utilize a "Best of Two Hands" re-characterization. If the banker position turns out to win either the current hand or the next hand, the bettor is paid a small adjusted payout. The player loses his bet only if both hands lose.

"Two Ways to Win"—Ex: A baccarat bettor wagers on player and is ahead 7-1 after the first four cards are dealt. He chooses to utilize a "Two Ways to Win" re-characterization. His bet now pays (i) a first adjusted amount should the player position end up winning or (ii) a second adjusted amount should a tie occur. The first and second adjusted amounts are based at least on the likelihood that either situation occurs (the player wins or a tie occurs). This provides players with a chance to win in different ways.

"Jackpot"/"Progressive"—Ex: a player re-characterizes his wager to an extremely unlikely outcome, such as "4×4♠" (the Player and Banker hands each feature two 4♠). This bet may pay a jackpot amount. The jackpot amount may be adjusted based on the odds of occurrence and a house edge (as other re-characterizations are), may be flat, may be "progressive" (increasing in size as funded by players, until it is hit), "personal" progressive (each individual builds toward his/her own jackpot), or some combination of these. "Late Player"/"Late Banker"/"Late Tie"/"Late Action"—Ex: After seeing two or four cards dealt in a hand of baccarat, assuming no natural is in play, the player can place a late bet on "Player," "Banker" or "Tie," paying at adjusted odds. For example, after the initial value of the player and banker position cards is determined, the player may be offered modified odds or payout against any additional funds the player wishes to wager at that time. For example, a player may be offered dilutional odds of less that 1:1 if/when it is determined that the player placed an initial wager on the Player position and the player hand dealt is determined to be relatively strong in comparison to the banker hand dealt.

"Natural 9 Pays Triple"—a player may be paid triple what would otherwise be owed to him if he wins with a Natural 9 and had this type of bet placed for the hand. In some embodiments, the player may be paid less on all other wins for such a hand. In one embodiment, the Natural 9 must win to be paid the re-characterized bet odds (e.g., 9-9 may still be a push).

"Natural 8 Pays Double"—in some embodiments, a player may be paid double what would otherwise be owed to him if he wins with a Natural 8 and had this type of bet placed for the hand. In some embodiments, the player may be paid less on all other wins for such a hand. In one embodiment, the Natural 8 must win to be paid as the re-characterized bet odds (e.g., a loss to a 9 may still be a loss, and an outcome of 8-8 may still be a push).

"Tie on the Deal"—a player who places this bet may be paid even money if after first two cards are dealt to each hand, the score is 9-9, 8-8, 7-7 or 6-6. In some embodiments, a player placing this bet may be paid less on all other wins.

"No Draw"—Bettor automatically wins if there are no cards drawn to either hand. In some embodiments, the bettor may be paid less on all other wins. In some embodiments, the bettor can only be paid on the No-Draw outcome or if the hand wins. For example, if there is a no-draw situation and the player's hand wins, the player is not paid on both outcomes. In other embodiments, the player is paid on both outcomes.

"Any 8"—a bettor is paid if either hand position is an 8. In some embodiments, the bettor may be paid less on all other outcomes.

"Second Chance"—for a player who places this bet, the outcome in a no-draw situation may be re-evaluated based on individual hand characteristics. For example, the highest card in each hand may be compared, or the lowest card's value may be doubled and added to the hand's total. In another embodiment, the difference between the two cards in each hand may be found and added to the hand's value. Thus, the player's bet is given a "second chance". In situations where a hand ends in a no-draw tie (e.g., 7-7, 6-6) the tie may be broken based on one or more individual hand characteristics. In situations where a hand loses to a natural (e.g., 3-8, 4-9, etc.) the outcome may be re-evaluated based on one or more individual hand characteristics.

"Surrender for Free"—In some embodiments, after the initial value of the player and banker position cards is determined, the player may be offered a settlement payment (or other consideration) in exchange for agreeing to have his wager resolved prior to the determination of a final outcome associated with the game instance. For example, after the initial value of the player and banker position cards is determined, the player may be offered the opportunity to reduce (or even withdraw entirely) the amount of his initial wager ("Surrender for Free"). Alternatively, the player may be offered an immediate payment (e.g. based on the player's wager amount, or other factors) in exchange for forgoing any payout that the player may eventually be entitled to upon the determination of a final outcome associated with the game instance (an Instant Win). In some embodiments, the determination of such offer(s) may take into account one or more of: (i) the composition of cards remaining in the shoe and yet to be dealt; and/or (ii) the composition of cards having previously been dealt with respect to the given shoe. In some embodiments, this taking into account may serve to establish a payout factor (e.g. odds) or payout amount (e.g. $X) to be offered to the player prior to final resolution of the game instance. In some embodiments, incremental profitability or house edge may be realized by this taking into account (e.g. players may perceive the odds or payouts offered as a reflection of a "neutral" or "fair" composition of cards remaining to be dealt, when in fact a table computer may incorporate data regarding cards composition(s) into the determination of such payouts and/or odds). Some example "Instant Win" Payout Calculations follow.

In some embodiments, a first step to calculating an Instant Win payout may be to determine whether the bet is eligible for Surrender or Instant Win. In some embodiments, hands characterized as "Underdog" hands may be eligible for Surrender offers, while hands characterized as "Favorite" hands may be eligible for Instant Win offers. For example, in some embodiments a wager or hand may be categorized as an underdog or favorite based on whether its expected value in the current situation would be positive or negative on a new shoe (e.g. where card composition needn't be considered). Wagers with a positive expectation, e.g. a Player bet with a current hand total of six versus a Banker total of three, may be characterized or considered "Favorite."

In some embodiments, "favorite" hands are offered Instant Win payouts that are dynamically calculated based on hand situation and remaining card composition in the shoe. In some embodiments, such Instant Win payouts are different in the way that they are bounded on both the top and bottom. For example, in some cases, the bottom bound for favorite hands may be to offer "Surrender for Free," (e.g. the option for a player to have his bet returned with no payout and no penalty). In some embodiments, if it is determined that offering Surrender for Free would result in an acceptable house advantage, it is indeed offered and the acceptable range of house advantage percentages is configured in the paytable file of the table computer.

In some embodiments, if Surrender for Free is not offered, an Instant Win payout may be dynamically calculated for the wager. The payout may bounded by the payout value for a new shoe. That is to say, the offered payout is the lesser of the dynamically calculated payout for the current shoe composition, and a static neutral-shoe payout based on a new shoe. If the expected value of the wager is too low to offer any of the above options with an acceptable house advantage, the Instant Win option may be disabled with respect to the given wager.

In some embodiments "underdog" hands may be bounded by Surrender for Free as a maximum payout. Like favorite hands, underdog hands may be offered Surrender for Free when the house advantage of such an offer is within an acceptable range. Alternatively or in addition, underdog hands may be offered Surrender for Free when the shoe composition causes the underdog wager to become a favorite.

In some embodiments, if Surrender for Free is not offered, a Surrender offer is dynamically calculated. In such a case, the Surrender offer offers to return a portion of the player's wager. In accordance with such embodiments, the offered Surrender value will be the greater of the dynamically calculated value and a static neutral-shoe value based on a new shoe.

In some embodiments, if it is determined that the calculated Surrender value is less than X % (e.g. 5%) of the wager, the Surrender option will be disabled for this wager. This threshold value can be adjusted (e.g. by a casino administrator) in the paytable file of the table computer.

In some embodiments, a player may be required to pay for the possibility/option of having the "Surrender for Free" feature available to him during game play A variety of late options related to a wager in baccarat are discussed in the '222 Application, previously incorporated herein by reference for all purposes. As alluded to above, the odds for the re-characterized wager are infrequently the 1:1 or 0.95:1 odds of the initial wager. Rather, the re-characterized wager may be paid out at odds that are determined by one or more of the following factors: (i) the probability that the re-characterized wager will result in a win (e.g., given factors such as a) the current cards in play, b) historic cards dealt from the same shoe (so as to mitigate the exposure to card counters), and c) the intermediate stage of the hand at which the re-characterization is made (a re-characterization placed with only one card in play will pay differently than one placed with four cards in play), (ii) the amount of the original bet, (iii) the amount of a second bet associated with the re-characterization (if applicable), (iv) the expected value (EV) of the original bet, (v) a player status rating (some players may receive better payouts than others), (vi) rules for rounding payouts to even amounts, and/or (vii) a house advantage (the house pays winning re-characterizations "EV minus a given house advantage, plus/minus any modifications for player status"). The modified odds are sometimes referred to herein as the adjusted odds or the rated odds. Similarly, the payout may sometimes be referred to herein as the adjusted payout or the rated payout. When re-characterizations implicate a plurality of hands (e.g., as described below, "Two in a Row"), a house edge may be deducted once for each implicated hand (e.g., "Two in a Row" pays EV minus twice the house edge plus/minus adjustments for player status).

In one embodiment, all re-characterized bets are paid out at fixed adjusted odds, regardless of what cards are showing at the table. In another embodiment, the adjusted odds may vary depending on the nature of the re-characterization wager and/or the cards on display at the time the re-characterization wager is made (i.e., the cards shown are used to help calculate the expected value of the various re-characterization wagers). Because it may be difficult for the dealer and players to remember a large number of dynamic adjusted odds, the dealer and/or player may use a look up table or the like that shows what the odds are for a particular deal. For the simple embodiment shown in FIGS. 1-7, the look up table may be available for players and dealers to review in the form of a book. Each page of the book could have a different re-characterization wager on it with a table that shows all the possible hands and the odds. Additionally, a column or entry may be provided that describes the payout per $100 (or other desired denomination) wager. An example of such a page from such a book is presented in FIG. 9. When the intermediate outcome is revealed, the player and/or the dealer may refer to the look up table and determine the odds and the potential payout for the wager stack 46 that the player currently controls for a given deal. Based on the published odds, the player may decide whether or not to re-characterize the bet. Again, it is worth noting that the odds for the re-characterized wager may be more favorable for the gaming establishment than the normal house edge for the game.

The adjusted payouts may further take into consideration rules for rounding payouts to even amounts so that fractional amounts do not have to be tracked. A rules based system of a computing device may dynamically determine (i) a direction for rounding (up or down) and/or (ii) a denomination to round to based on numerous factors, such as (a) recent rounding decisions, such that an overall advantage is maintained across numerous instances of rounding (e.g., some round up, some round down, resulting in an average); (b) the player's bet amount, and the like. A recent history of payouts considered for rounding may be associated with a casino, table, player or other element. However, this sort of historical tracking may be difficult to implement on the table 10 and is more suited to the smart table 150 described in greater detail below.

In summary, re-characterizing a bet may change a condition for payout such as by making a condition for payout more restrictive (in which case, the payouts may be increased), less restrictive (in which case, the payouts may be decreased), or have comparable likelihood of occurring. Additionally, the player may choose to add winning events to the wager in play such that the player may receive two payouts. This embodiment is particularly useful for split type re-characterizations. Examples include initially wagering on banker and then re-characterizing through a split the wager as a "Banker 9" wager. Thus, the player may win a first amount if the banker wins and a second amount if the banker wins with a 9. Re-characterization may increase or decrease the likelihood that a player wins. As noted, the payouts may increase or decrease accordingly to preserve a desired house edge.

Figure 3:
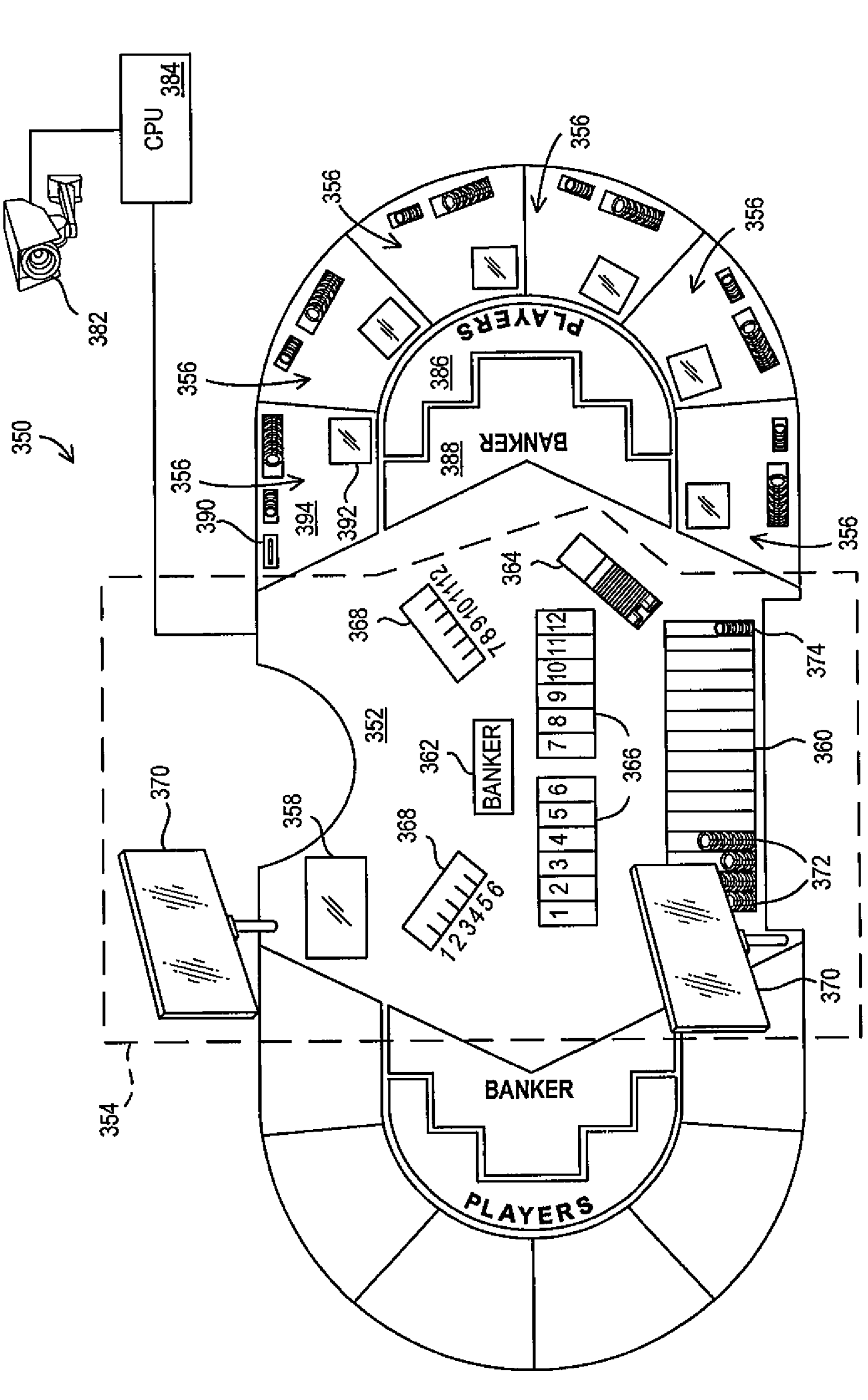
FIG. 3 illustrates a top planar view of a smart table for facilitating a baccarat game, in accordance with some embodiments.

Referring now to FIG. 3, illustrated therein is an electronic table 350 that is operable to facilitate many of the functions described herein (e.g., tracking wagering activity and game outcomes, calculating payouts due to players and losses incurred by players to aid dealers in providing accurate payouts and collecting accurate losses, calculating dynamic odds, dynamically determining information about possible re-characterization bets, etc.). Table 350 has a planar top surface 352 on which game play takes place. The table 350 further has a dealer station 354 and at least one (e.g., seven) player station 356 (player stations are also referred to herein as player positions). The dealer station 354 has space for the various dealers to stand or sit and may include a dealer monitor 358, a chip rack 360, a banker hand area 362, a shoe 364, a commission recordation area 366, and a tie wager area 368. Additionally, monitors 370 may be positioned proximate the dealer station 354 in such a manner that all the players may perceive the monitors 370. While two are shown, it should be appreciated that more or fewer may be used as desired. The present disclosure also sometimes refers to the monitors 370 as a tote board.

The dealer monitor 358 and the monitors 370 may be displays as that term is defined in the Rules of Interpretation set forth below. It is particularly contemplated that the dealer monitor 358 has touch screen functionality. Alternatively a keyboard or other input mechanism may be provided (not shown). The dealer monitor 358 may be used to inform the dealer which players are owed how much as a payout on re-characterized bets and/or normal bets. Additionally, the dealer monitor 358 may inform the dealer when to hit the player hand or banker hand, what the point totals are, how much is owed by players for commissions, how many comp points are due a particular player, how much a player has won or lost, whether a player is trying to make a re-characterization bet that is valid or invalid, or other information as desired.

The monitor(s) 370 may be used to provide information about historical outcomes so that players may review the historical outcomes. Additionally, the monitor(s) 370 may list what bet re-characterizations are available and the adjusted odds or payouts associated with any such re-characterization. If a particular bet re-characterization is not currently available, it may be grayed out, listed as "N/A" or otherwise denoted in such a manner that players may understand that the particular bet re-characterization is not available. Again, monitor(s) 370 may be implemented in a variety of manners, not restricted to the number of monitors 370 appearing at a table or the type of monitor being used. Monitors 370 may take the form of a physical sign, perhaps with physically adjustable components to indicate changes to payouts or odds (e.g., an attendant can "call up" or swap in a new set of odds or payouts for a given re-characterization type and/or game circumstance by making a few simple changes).

Chips 372 and/or tokens 374 (for embodiments in which tokens are utilized) may be positioned in the chip rack 360 and used throughout the table 350.

Figure 5:
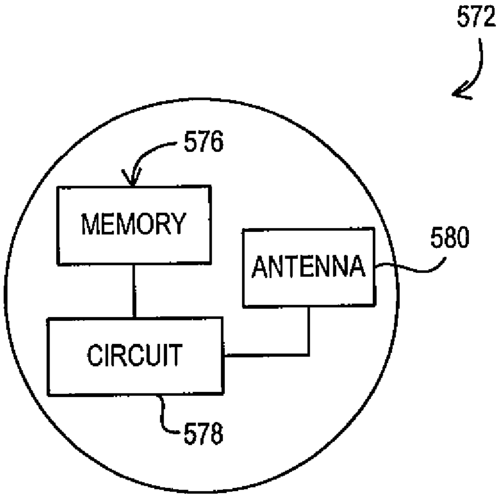
FIG. 5 illustrates a simplified schematic diagram of an RFID chip.

An embodiment of an RFID-enabled chip (e.g., such as one of the chips 372 of FIG. 3) is illustrated in FIG. 5. Turning briefly to FIG. 5, an example chip 572 consistent with some embodiments includes a radio frequency identification (RFID) tag or memory 576 with an electronic circuit or processor 578 and an antenna 580. The chip 572 may be similar or identical to those disclosed in U.S. Pat. Nos. 5,166,502; 5,676,376; 6,021,949; and 6,296,190, and U.S. Patent Application Publication Nos. 2004/0207156 and 2004/0219982 which are all incorporated by reference in their entireties. Gaming Partners International (GPI), of 1182 Industrial Road, Las Vegas, Nev. 89102 and Abbiati Casino Systems of Strada della Risera, 9-10090 Rosta (Torino—Italia) both sell RFID chips suitable for use with the table 150, although neither product is specifically required to practice the concepts of the present disclosure. The GPI chip uses a standard microchip made by Philips Semiconductors called the Vegas S, each of which has a unique serial number. The gaming establishment (e.g., casino) or other entity may associate values with each serial number. The association may be in a look-up table or the like. Alternatively, the unique identifier may be encoded to include information therein. Likewise, the chip 572 may be color-coded or include other indicia that indicates a value or other information to the player or dealer. In some embodiments, plaques may be used instead of chips (e.g., for exceedingly large denominations).

In use, the electronic circuit 578 and antenna 580 act as a transponder capable of responding to an interrogator of the table (not shown in FIG. 5). The interrogator may be a sensor or other component operable to detect, recognize, determine, identify or sense the presence (or absence) of an RFID-enabled chip. The interrogator may also be operable to detect, determine, identify, recognize or receive various information about a chip (e.g., chip identifier, chip set identifier, chip denomination, chip status, etc.). The interrogator may also be operable to transmit information to one or more processors or memories (e.g., information regarding the presence or absence of a chip in a certain location, an identifier of a chip, etc.). In some embodiments, an interrogator may operate in accordance with passive RFID technology and/or comprise an antenna.

In accordance with some embodiments, the interrogator sends out an electromagnetic signal that impinges upon the antenna 580, exciting a current within electronic circuit 578. In response to the excited current, the electronic circuit 578 causes the antenna 580 to emit a second electromagnetic signal as a response, which is received by the interrogator. The second signal has identifying information about the chip 572 encoded therein such that the interrogator can identify the chip on receipt of the second signal. The second signal may be generated passively or actively. That is, in a first embodiment, the energy from the interrogation signal provides sufficient power for the electronic circuit 578 to use to send the second signal. In a second embodiment, the electronic circuit 578 may include a battery or other power source, which is used to power the generation of the second signal. While batteries have increasingly small footprints and longer lives, it is generally more practical to have a passive transponder.

It should be noted that, as described in previously-filed Application '222, in some embodiments tokens used to indicate placement of a re-characterization bet may be RFID tokens, each having its own unique identifier. The embodiments of how RFID-enabled tokens may be used for bet re-characterization are incorporated by particular reference herein. It should be understood that use of RFID-enabled tokens to indicate bet re-characterization may not be necessary or preferred in some embodiments. For example, in some embodiments an electronic table such as the table 350 may be useful in facilitating wagering without the use of re-characterization bets. In another embodiment, the table 350 may be useful in embodiments in which the placement and identification of re-characterization bets is performed without the use of tokens but is instead performed by tracking chip movement on the table, as will be described below.

Returning now to FIG. 3, in some embodiments, a camera 382 may be positioned over the table 350 and operatively connected to a central processing unit (CPU) or processor 384 associated with the table 350. The CPU 384 may be a control system as that term is defined in the Rules of Interpretation provided below and may control and coordinate the functions of the various components of the table 350.

The chip rack 360 may include an RFID interrogator. An exemplary chip rack of this sort is made by GPI under the trade name CHIP BANK READER. Alternatively, the interrogators described in U.S. Pat. Nos. 4,814,589; 5,283,422; 5,367,148; 5,651,548; and 5,735,742—all of which are incorporated herein by reference in their entireties—could be used. Another RFID tag and interrogator suitable for use with at least some embodiments of the present disclosure are produced by Texas Instruments as the TAG-IT™ product line. An improved interrogator is discussed in U.S. Patent Application Publication 2006/0077036, which is also incorporated by reference in its entirety.

The shoe 364 may be an intelligent shoe such as the IS-T1™ and IS-B1™ or the MD1, MD2 sold by Shuffle Master or comparable devices. The shoe 364 may be able to determine which cards are being dealt to which player station through RFID technology, image recognition, a printed code on the card (such as a barcode), or the like. The particular technique used to recognize cards is not central to the present disclosure. Further information about intelligent shoes may be found in U.S. Pat. Nos. 5,941,769 and 7,029,009, both of which are incorporated by reference in their entireties and U.S. Patent Application Publications 2005/0026681; 2001/

7862227; 2005/0051955; 2005/0113166; 2005/0219200; 2004/0207156; and 2005/0062226 all of which are incorporated by reference in their entireties. In place of an intelligent shoe, cameras, such as camera 382 may be used with pattern recognition software to detect what cards have been dealt to what player stations, what chips 372 have been wagered, and what tokens have been used by particular player stations. One method for reading data from playing cards at table games is taught by German Patent Application No. P44 39 502.7. Other methods are taught by U.S. Patent Application Publication 2007/0052167 both of which are incorporated by reference in their entirety. Similarly, cameras 382 may be used to detect when a token was given or removed from a specific player. This information may be helpful should the gaming establishment need to audit a session.

In some embodiments, an intelligent shoe may indicate to a dealer whether or not a card may be taken from it. For example, if cards that have previously been dealt have not yet been overturned, or there is a problem with a player's bet, a red LED associated with the shoe may illuminate. When a dealer is allowed to take another card, a green LED may illuminate. The shoe may even physically prevent the dealer from taking a card if the system determines this is appropriate.

The player station 356 may include a player bet area 386, a banker bet area 388, a player tracking mechanism 390, a player monitor 392, and a chip reserve area 394. As before, the player bet area 386 and the banker bet area 388 are delimited by indicia onto which the player may place a wager stack 46. However, the player bet area 386 may include one or more interrogators 396 which detect, recognize, identify or determine chips 372 and/or tokens (e.g., in embodiments in which tokens are utilized to identify re-characterization bets) placed in the player bet area 386. Likewise, the banker bet area 388 may include one or more interrogators 398 which detect chips 372 and/or tokens (e.g., in embodiments in which tokens are utilized to identify re-characterization bets) placed in the banker bet area 388.

In some embodiments, a common area may be included on table 350, for common placement of chips or wagers that are associated with two or more distinct players. In such embodiments, such a common area may be associated with one or more distinct interrogators (not shown).

In some embodiments, a single player station 356 may include interrogators associated with two or more players. For example, one interrogator may be intended for a first player playing the game at the table and another interrogator for a second player (e.g., a "back bettor") who may be betting along with or in association with the first player, either remotely or from essentially the same location, but whose chips and betting activity is to be separately tracked.

The player tracking mechanism 390 may be a card reader adapted to receive a magnetic stripe card such as is commonly used in gaming establishments. Alternatively, the player tracking mechanism 390 may be a smart card reader, an RFID interrogator that interrogates a player tracking RFID fob, TITO device (for reading player data encoded on a ticket), or other device as desired.

The player monitor 392 may be a display as that term is defined in the Rules of Interpretation set forth below. The player monitor 392 may be a touch screen display and/or have associated input elements such as a keypad or keyboard. Collectively, the player monitor 392 and any associated input elements are termed a player interface. Information about the player, about the available bet re-characterizations, a history of outcomes, any adjusted odds or payouts for a particular available bet re-characterization, or other information may be presented on the player monitor 392 as described herein. In a first embodiment, each player station 356 has its own monitor 392. While not shown, the player station 356 may also include a bill acceptor and/or a cashless gaming receipt device such as the TITO bill validating device such as a FutureLogic GEN2™ PSA-66 device configured to operate within an EZ-PAY™ system by IGT. Another variation is to use a mobile terminal such as a personal digital assistant, palm-style computer, cellular phone, hand held or laptop computer as a display. In some embodiments, table 350 does not include a player monitor 392 at any of the player stations (e.g., to preserve a more traditional look of the table).

In some embodiments (including some embodiments in which table 350 does not include a player monitor 392 and/or re-characterization bets are not utilized and/or not indicated via use of tokens), a player may indicate desired wagers (traditional wagers and/or re-characterization wagers) by movement and/or placement of chips on the table (either by the player or by the dealer on behalf of the player). Such movement and/or placement may be tracked by one or more interrogators of the table and recorded (e.g., in a memory of the table). Further, in some embodiments the movement and/or placement of chips may be interpreted, by a processor of table 350, as the placement of a particular bet (a traditional bet and/or a re-characterization bet, including the value thereof) and an indication thereof may be displayed on a dealer monitor 358 (e.g., it may be determined that player A placed $100 bet on the player side and this may be indicated on the dealer monitor 358).

Figure 4:
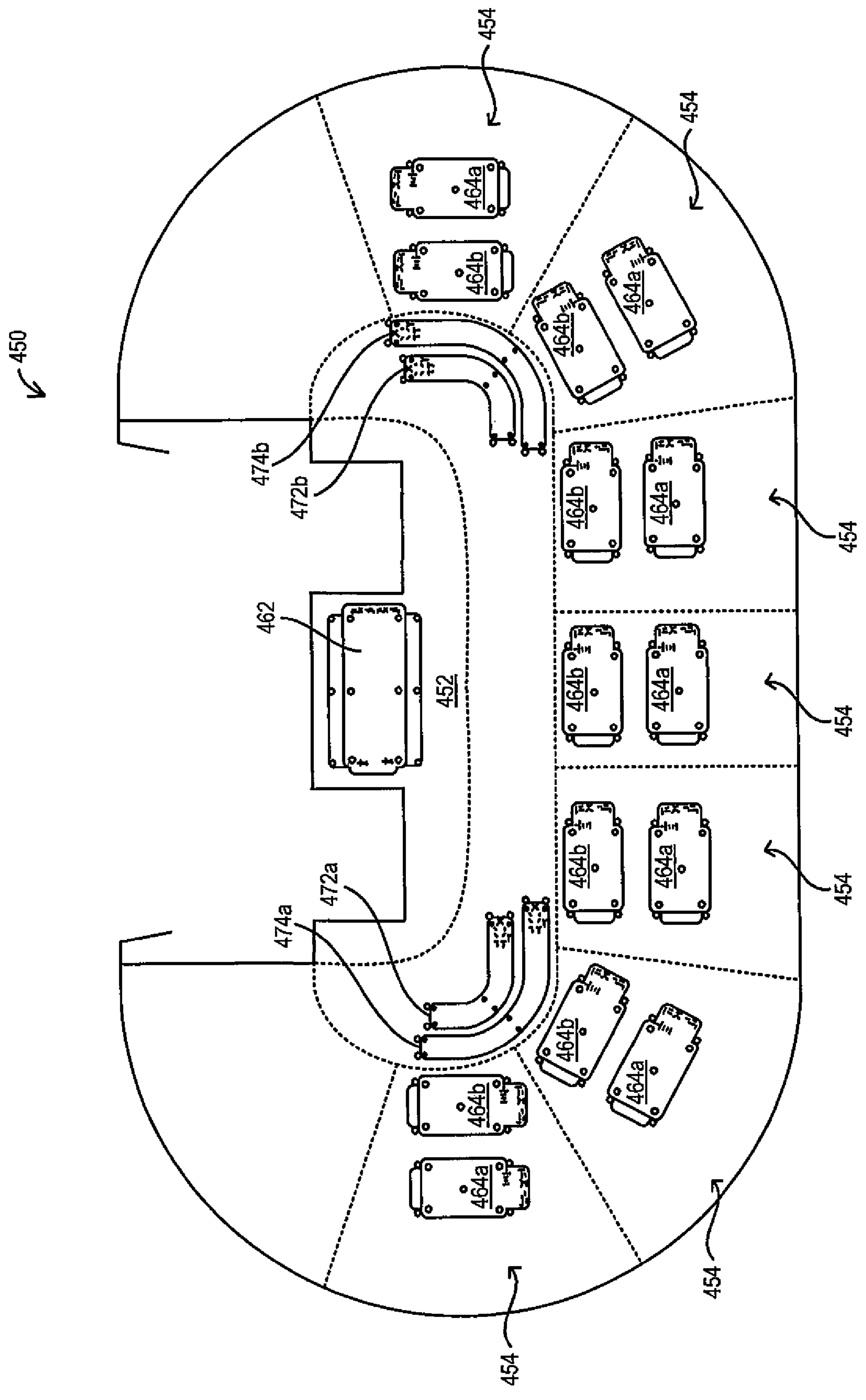
FIG. 4 illustrates a diagram of an antenna or interrogator layout on a smart table for facilitating a baccarat game, in accordance with some embodiments.

Turning now to FIG. 4, illustrated therein is one embodiment of how a plurality of interrogators or antennas may be placed on a table 450 (which may be one embodiment of table 350), in a manner that facilitates some of the embodiments described herein. The table 450 includes seven (7) distinct player positions 454. Each player position includes two antennas or interrogators, interrogator 464*a* and 464*b*, one for each bet spot or bet position available at each respective player position 454. Thus, if a player were to place a wager (e.g., one or more RFID-enabled chips) on a bet spot associated with interrogator 464*a*, interrogator 464*a* would recognize such placement (i.e., interrogator 464*a* would "acquire" the chip(s) comprising the wager). The table 450 further comprises a dealer area or position 452, which includes an interrogator or antenna 462.

Finally, the table 450 includes several shared or common bet positions or bet spots, each associated with a distinct interrogator or antenna. For example, interrogator 472*a* may be for a Player Pair bet spot, interrogator 472*b* may be for a Banker Pair bet spot, and interrogators 474*a* and 474*b* may each be for a Tie bet spot. Given the variety and number prop bets contemplated by the present disclosure in conjunction with the physical limitations of size and space a gaming table may be allowed to occupy, Applicants have recognized that in some cases, it may be beneficial to provide for common or "shared" betting areas. That is, rather than associating or providing a plurality of physical betting areas for each individual player seated at the gaming table, it may be beneficial to instead offer one or more common betting areas (each associated with a given wager type), accessible to all players.

In some embodiments, player wagers placed upon such shared betting areas of the gaming table may be identified and/or associated with respective player(s) having placed such wagers via one or more RFID sensors incorporated into the layout of the table itself. In one embodiment, a player desiring to place such a wager may indicate his interest in doing so (e.g. audibly, via a hand signal) to the dealer. Thereafter, the dealer may place physical chips representing the player's wager on a first dedicated area of the gaming table associated with the player, the first dedicated area being associated with an RFID sensor. The RFID sensor then transmits an indication of the wager amount and associated player (or player position) to the table computer, which then stores data associated with the wager. Thereafter, the dealer (and/or player) may move the chips representing the player's wager to a second "shared" area of the gaming table, which may be associated with a second RFID sensor. Upon resolution of a game instance associated with the wager (e.g. upon completion of a hand of baccarat), an outcome associated with the wager is determined (e.g. win/loss) along with any corresponding payout that may be entitled to the player. If the player is entitled to a payout, the dealer may then place chips representing such payout on the second dedicated area of the table. The payout is recorded by the table computer via the second RFID sensor. The original wager and payout may then be placed on the first dedicated are (associated with the first RFID sensor), serving to thereby record an indication of the payout having been provided to the associated player. Additional details on embodiments for associating wagers placed in common betting areas with a specific player position are described in more detail below.

Each interrogator or antenna may have a predetermined range within which it recognizes, determines, identifies or acquires a chip. Thus, if one or more chips comprising a wager is placed within the acquire range of interrogator 474*a*, it may be inferred or determined that a player (e.g., the player who is associated with the acquired chip(s)) is placing a Tie bet wager.

It should be noted that the number and placement of interrogators or antennas illustrated in FIG. 4 is exemplary only and should not be construed in a limiting manner. For example, more than two antennas may be associated with a given player position. In some embodiments, a first antenna associated with a given player position is associated with a first player (e.g., the primary player playing at that position) while a second antenna associated with a given player position is associated with a second player (e.g., a remote player or back betting player). In some embodiments, each interrogator or antenna of a table may be uniquely identified, such that if data or information is received from a particular antenna, that data or communication may comprise a unique identifier of the antenna that allows for a determination of the bet spot and player position associated with that data or communication.

It should be understood that, in alternate embodiments, a shared or common betting position may not be associated with its own antenna. In such embodiments, another way to associate a wager with a player position may be to use a token instead of a shared antenna. In such an approach, a player may be allowed to place a bet on his betting spot and the dealer may place token on it (i.e., on the chip or chips comprising the bet). The particular token used is recognized by the system, based on the data encoded in the chip, as representing a particular shared bet (e.g. tie, player pair or banker pair). The bet and the token may then be removed from the bet spot and placed on the shared or common bet position. The system of the smart table may be operable to recognize that the bet and token removed from the player's position are now an active bet associated with a particular player position because the token had been present on the player's position and thus associated with the player's antenna and then all the chips, including the token, were removed at once within a short span of time. To cancel the bet, the chips and token maybe replaced on the player's antenna and only the token may be removed. To pay out a winning bet, the wagered chips and token may be placed on one of the player's antennas and then the net payout may be added to the same antenna. Alternatively, the dealer may simply place the token and gross payout on one of the player's antennas in a single move.

It should be noted that this alternate methodology which allows for associating a bet in a common bet area with a particular player position may be useful in other embodiments, to decrease the number of antennas needed on a table.

An interrogator or antenna such as any of those illustrated with respect to FIG. 4 may determine, read, receive, obtain, recognize or determine various information or data from or about an RFID-enabled chip placed within a predetermined range of the interrogator. The following are examples or some of the information or data that may be so determined: (i) a unique chip identifier, which uniquely identifies the chip; (ii) a currency of the chip; (iii) a denomination of the chip (which may be its monetary value; in the case of a token it may comprise the token type); (iv) a chipset identifier, which differentiates types of chips (e.g., cash vs. non-negotiable, differentiating tokens from monetary chips, chip validity); (v) a casino identifier that uniquely identifies a casino or other registered gaming corporation associated with the chip (this information may also be used to determine chip validity); and (vi) a site identifier that uniquely identifies the physical casino site for which the chip is valid. It should be noted that not all of the above information is necessary or desirable for all embodiments. It should further be noted that any or all of the above-listed information may be stored in a memory of a given chip and transmitted to an interrogator via a signal from the chip.

To illustrate a use of the interrogators shown in FIG. 4, a non-limiting example is provided in which a placement of a re-characterization bet is inferred based on information received or obtained from one or more interrogators. In the example, assume that a re-characterization bet has been offered to a particular player based on configured rules such as the presence of a standard baccarat bet (on either the Player or Banker antenna) and particular player and banker hand values and numbers of cards drawn. In this example, if chips are added to the opposite antenna from the player's existing bet, the system be programmed to infer that these chips are the wager for the offered re-characterization bet. Similarly, the addition of chips to an antenna that already contains another bet may be used to infer the placement of a re-characterization bet by a player. For example, the system may be operable to differentiate two or more bets on the same antenna in the following way: (i) determine that a re-characterization bet has been offered to a player; (ii) determine the placement of additional chips to a betting position associated with an antenna, which position already has chips placed thereon; (iii) infer that these new chips represent the offered re-characterization be; (iv) register the placement of the re-characterization bet based on some rule, such as a card is drawn; and (v) repeat the above process for additional bets on the same antenna (i.e., for additional bets or chips placed on the betting position associated with the same antenna).

In another embodiment, the system described herein may be operable to determine or infer placement of a re-characterization bet by a particular player or register a re-characterization bet to a particular player position based on a positional history of the chips being used to place the re-characterization bet. Such an embodiment is described in more detail below with respect to FIG. 7.

Figure 6:
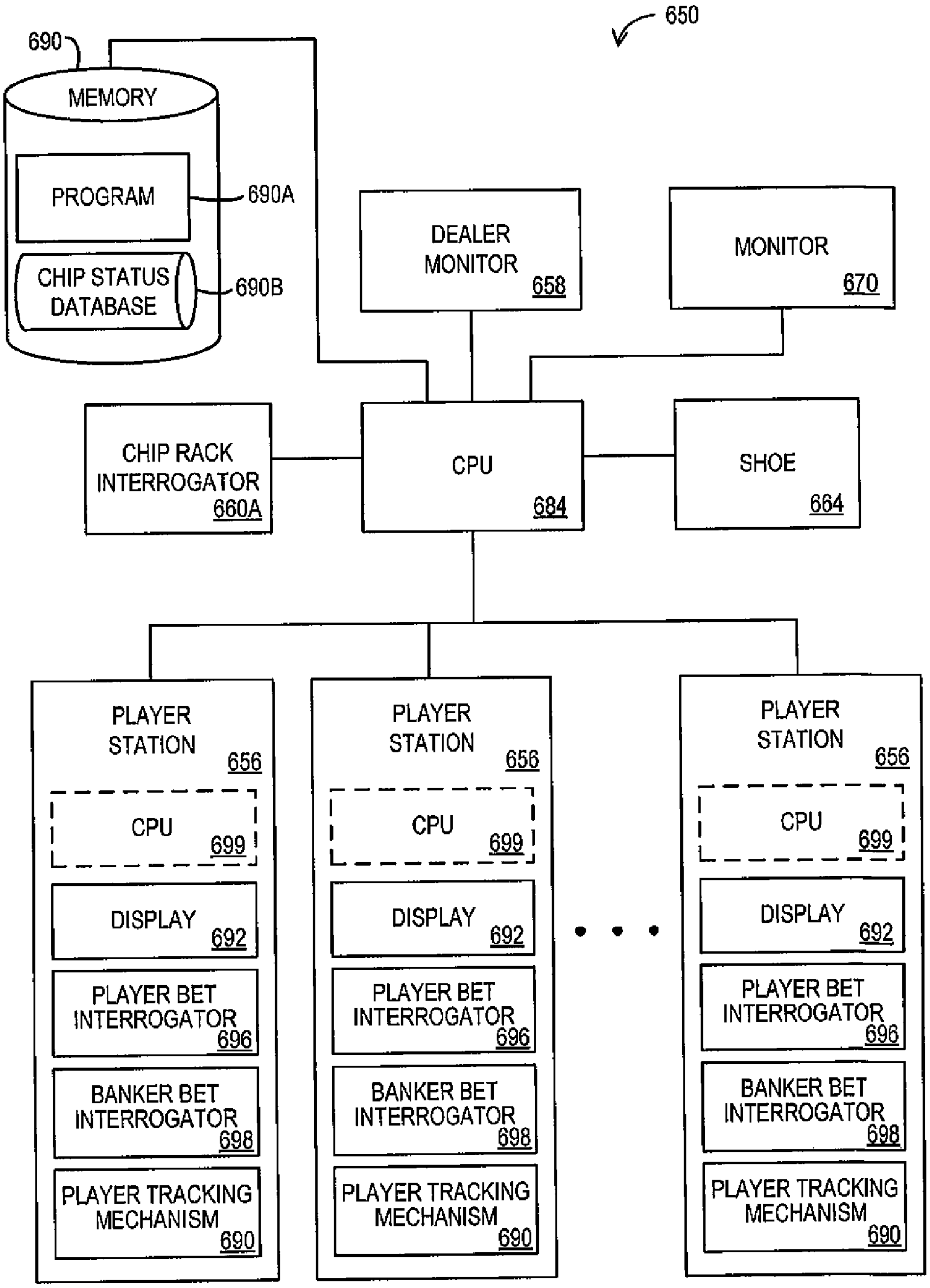
FIG. 6 illustrates a block diagram of the table of FIG. 3.

The various electronic components of a smart table consistent with some embodiments described herein (e.g., a table such as table 350 of FIG. 3) may communicate with one another as better illustrated by the block diagram of FIG. 6.

FIG. 6 illustrates a block diagram of a table 650, which includes one or more processors or CPUs 684. The CPU 684 may act as the main processor or "brains" of the table 650. The CPU 684 may be part of the table 650 or may be remotely positioned therefrom. It is possible that the CPU 684 may be a central server that controls multiple tables concurrently if desired. The CPU 684 may be communicatively coupled to the various components through a network (not labeled) as that term is defined in the Rules of Interpretation set forth below, a bus, or other communication system as desired.

The CPU 684 may control all the various components and perform all the calculations according to software stored in a computer readable format in a memory unit (not shown). For example, the CPU 684 may receive data from the shoe 664 and or the interrogator 660A associated with the chip rack 660. Likewise, the CPU 684 may control the player tracking mechanisms 690, the monitors 692 and any sensors that track bets such as player bet interrogator 696 or banker bet interrogator 698. Alternatively, functions specific to individual player stations 656 such as control of the monitor 692, interpretation of data from the interrogators 696, 698 and the like may be controlled by player station processors 600. As yet another alternative (not illustrated), a single player station processor 600 may control all the player stations and a second CPU 684 control the table such that the single player station processor 600 is a client for the CPU 684.

Table 650 further includes a memory 690 that is accessible by and/or operable to communicate with CPU 684. The memory may be stored in the same location as CPU 684 or in a different or remote location. The memory 690 may store a program 690A for directing the CPU 684 and one or more database, such as a chip status database 690B. The chip status database 690B may store, for example, a chip position history for chips in play on a given table (or a plurality of tables). In some embodiments, the chip status database 690 may also store an indication of a validity of a chip, whether the chip is negotiable, etc.

An automated table such as illustrated in FIG. 3, FIG. 4 and/or FIG. 6 may render the dealer's tasks and record keeping associated with the play session greatly eased and facilitated. For example, as described herein and according to some embodiments, RFID sensors such as antennas or interrogators may be deployed in a gaming table for the purposes of (i) determining a wager amount associated with a player position; (ii) determine a wager type associated with the wager amount and/or player position; and (iii) transmit an indication of the wager amount and wager type to a table computer for output at a dealer output device. In accordance with some embodiments, the table computer may operate to receive (or otherwise determine) a game result and, based on: the wager type; wager amount; and game result, output a payout instruction via the dealer output device. According to some embodiments, chips placed on the gaming table may be periodically (e.g. once every 0.5 seconds) interrogated by the RFID sensors in order to determine an initial wager amount and to determine any fluctuation in the initial wager amount during a period of time during which such fluctuations are not otherwise permitted (e.g. during the course of a hand of baccarat). If such a fluctuation is determined (e.g. a player surreptitiously adds to his wager after cards have been dealt), the RFID sensors may detect this and output a corresponding message via the dealer output device. Alternatively, or in addition a reporting signal may be transmitted to one or more centralized casino server systems to form a basis for casino personnel action.

In some embodiments, the RFID sensors may be employed in order to ensure that the dealer is indeed (a) awarding payouts to players (associated with a given player position and/or RFID sensor) that are accurate; (b) taking down or collecting any losing bets in their entirety; and/or (c) awarding payouts and/or collecting losing wagers in accordance with a desired and orderly process, protocol or order. For example, a casino may institute a preferred protocol for awarding payouts and/or collecting wagers, such that the dealer is instructed (e.g. via the dealer output device) to e.g. first collect any non-winning wager(s) prior to awarding payouts for winning wagers. In some embodiments, the RFID sensors may be employed in such a manner as to monitor the order and/or amount(s) of payout(s) in order to look for and derivations from the desired protocol. If such a derivation is detected (e.g. a dealer awards payouts for one or more prop bets prior to collecting one or more losing wagers), the sensor (s) may output an indication of the derivation to one or more of a dealer output device (e.g. "REMINDER: Collect losing wagers prior to awarding payouts for prop bets.") and/or centralized casino server systems to form a basis for casino personnel action. Thus, in some embodiments, the integration of a card reading shoe and the capture of bet data via RFID sensors such as interrogators or antennas may allow for the detection of overpays, underpays and cheating as the system tracks and records game outcomes and how each hand was bet. Anomalies detected based on such data may be communicated (or otherwise indicated) to dealers (e.g. with displays embedded in the table) and/or to supervisors, surveillance and management through a computer or other device including e.g. desktop computers, laptops, tablets and smartphone.

It should be noted that an electronic table such as described herein and in particular with reference to FIG. 3, FIG. 4 and/or FIG. 6 may be deployed and utilized without bet re-characterization features (i.e., a smart table as described herein may be used to facilitate a baccarat, blackjack, roulette or other table game with traditional wagering opportunities only, as well as with bet re-characterization opportunities as described herein).

Figure 7:
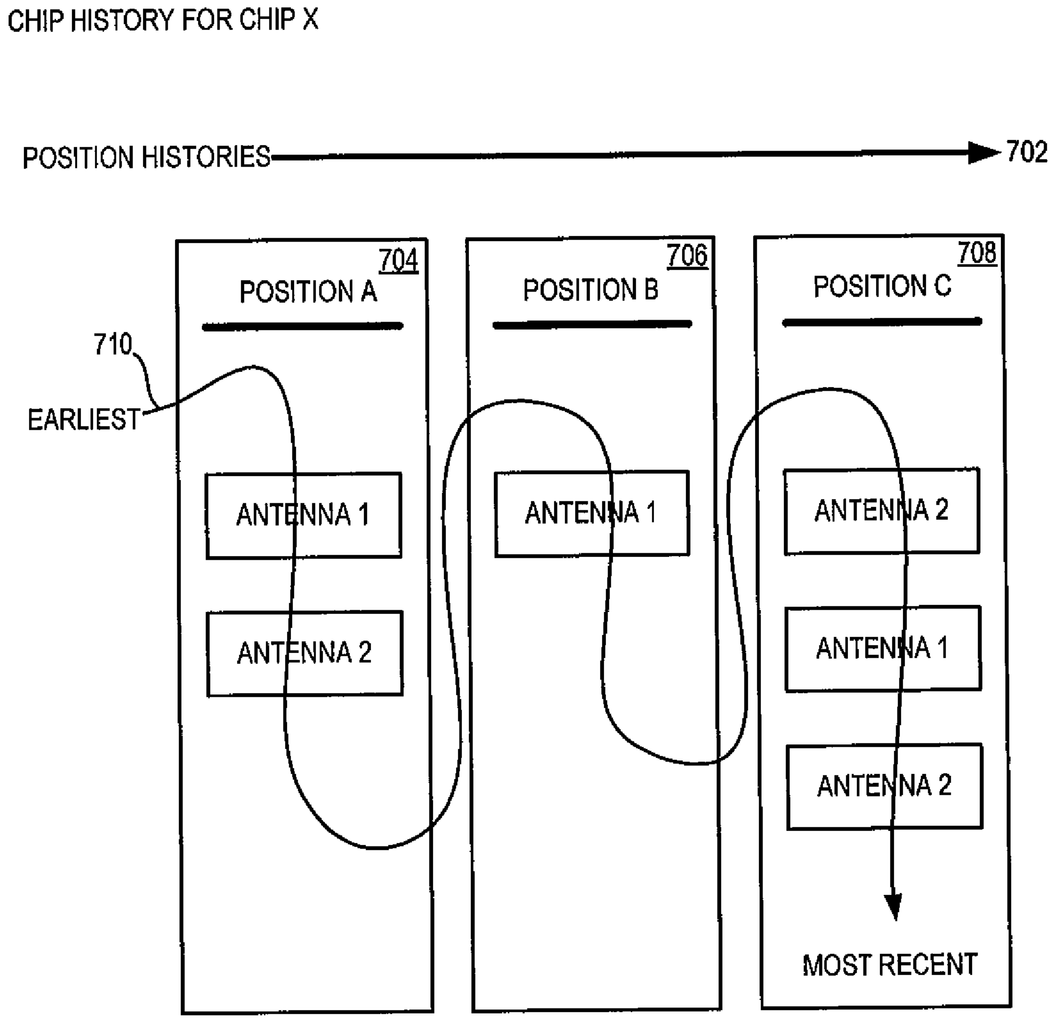
FIG. 7 illustrates how chip history for a particular RFID-enabled chip may be tracked and/or stored, in accordance with some embodiments.

Turning now to FIG. 7, illustrated therein is one method for tracking and storing the position history of an RFID-enabled wagering chip, for use in various embodiments described herein. For example, software usable with a smart table as illustrated in FIG. 3, FIG. 4 and/or FIG. 6 may be operable to track the position of chips on the table by their unique identifiers, and store the history of each chip on the table (i.e. a list of positions and antennas where the chip has been acquired).

It should be noted that, as illustrated in FIG. 4, a table consistent with some embodiments may contain antennas that are associated with a player, and others that are shared among all players. In such embodiments, it may be beneficial to determine what particular player position a chip is associated with when the chip is acquired on an antenna or interrogator associated with a common or shared betting area of the table. In one embodiment, the antenna history for that chip may be reviewed from the current antenna and going backward in time. The first antenna found that is associated with a player position will determine to which player position the chip should be associated. If no player-position associated antenna is found in the history, then an error message may be displayed to the dealer indicating that the chip should be removed from the shared antenna. Such shared antenna technology also allows for associating the wager to each player for accurate tracking of play.

Thus, in some embodiments bet data may be captured using multiple RFID antennas on a table and decisions may be dynamically made by the system of the table based on chip movements on the table. For example, in some embodiments, every available bet is associated with one or more antennas. In some embodiments, the player position that a particular chip is associated with may be determined by where the chip was located prior to its current location (e.g. ties, pairs, re-characterization bets (whether made by use of tokens or otherwise, etc.)). Data useful in chip position determinations may include the unique identifier of the chip and the unique identifier of the interrogator or antenna that has acquired or detected the chip within its predetermined range. In some embodiments, an RFID sensor such as an interrogator or antenna 464*a*, 464*b*, 474*a*, 472*a*, 472*b*, or 474*b* (FIG. 4) may be operable to transmit two types of messages to a processor of a system operable to facilitate embodiments described herein (e.g., processor 684 of FIG. 6: (i) CHIP X ACQUIRED ON ANTENNA Y (where X is the chip's unique ID and Y is the antenna identifier); and (ii) CHIP X EXPIRED FROM ANTENNA Y.

In some embodiments, when it is determined by a processor (e.g., processor 684 and/or processor 600 of FIG. 6) that a chip has been acquired at a particular interrogator or antenna (e.g., an acquire message is received, which includes the unique identifier of the chip), the processor may retrieve the history for the chip ("chip history") from a memory (e.g., memory 690 of FIG. 6), based on the chip's unique identifier. If no history exists then a new one may be created and stored in a memory (e.g., memory 690), associating a current position of the chip (e.g., the unique identifier of the antenna that has acquired the chip) in association with the chip's unique identifier. In accordance with some embodiments, a chip history may include a list of "position histories", each of which represents a position on the table that contains one or more antennas, and which is associated either with a single player position and/or single player or a plurality of player positions or players (i.e. a "shared position"). For example, on the 7 player position table illustrated in FIG. 4, the positions may be "PLAYER 1" through "PLAYER 7" (each of which may include a Player antenna and a Banker antenna), and a SHARED position (which contains a Player Pair, a Banker Pair and a Tie antenna). There may also be a DEALER position on the table that contains the dealer antenna, but in some embodiments this position is not part of the chip history.

Each "Position History" of a given chip (e.g., each record of a chip position history database or chip status database, such as chip status database 690*b*) may comprise a list of Antenna History Items, each representing the acquisition (when the chip is first recognized or identified as being positioned within the range of the antenna) and expiration (when the chip is determined to no longer be positioned within the range of the antenna) of the chip on a particular antenna.

Referring again to FIG. 7, illustrated therein is one embodiment of how a position history for a given chip "X" may be depicted or stored (it being understood that the information described with reference to FIG. 7 may be stored in different formats, based on preference or practicality). The chip history for chip X is illustrated along a position history timeline 702, which illustrates the oldest or earliest position at the left and continues towards the most recent position at the right. Line 710 visually represents the movement of the chip X over time over the noted positions of a table during a game. In the illustrated example, the chip X has been positioned or located at three different positions of a table: position A (block 704), position B (block 706) and position C (block 708). Each position may be associated with one or more antennas, as illustrated. It should be noted that the same position may occur multiple times in a given position history.

The antenna history items (labeled "Antenna 1", "Antenna 2" above) of FIG. 7, may each contain the following information in some embodiments: a name of the antenna, a time at which the chip was acquired on the antenna, and a time at which the chip left the antenna or was no longer detected or recognized as being within a predetermined range of the antenna (which is not defined if the chip is still on the antenna).

It should be noted that, in accordance with some embodiments, it may be desirable for the system to allow a chip to be moved across player positions momentarily without having the chip be tagged to or associated with that position. This is because, in some embodiments, the locations of the various player positions on the table may make it difficult for the dealer or a player to avoid passing his hand (which may be holding one or more chips) over other player positions while moving a chip from its initial player position to another (e.g., shared) position.

To prevent (or minimize the chances of) the chip from being tagged to or associated with a player position it crosses only momentarily, the Chip History may be configured with a "transient milliseconds" value, which is the minimum number of milliseconds a chip needs to remain on an antenna for it to be considered to have been acquired by the antenna. The use of this value will be further described below when discussing chip expiration.

In accordance with some embodiments, the system described herein receives a message that a chip was acquired on an antenna, the system may create a new antenna item for the chip and sets its acquisition time to the current time. Then the most recent position history for the chip may be examined (rightmost position in the diagram of FIG. 7). If this position matches the antenna's position, the new antenna item is added to the end of this position history. Otherwise a new position history is added to the list and the antenna item is added to that.

In accordance with some embodiments, after a chip is acquired on a particular antenna, the position associated with the antenna (the position on which the chip was acquired) will be the last position in the position list. The antenna history items in this position may be pared using the following procedure, which removes transient items based on the "transient milliseconds" value: if the antenna item has an expire time defined, and the total duration (expire time−acquire time)>the transient milliseconds value (e.g. the chip did not momentarily pass over the antenna), then add 1 to the antenna count.

When an expiration message is received from an antenna or it is otherwise determined that a chip is no longer on a position associated with a particular antenna on which it was previously acquired, the position histories of the chip are examined starting from the most recent position until a position is found matching the position from which the chip was expired. Then the antenna items in that position are examined from the most recent to the oldest (bottom to top in the diagram of FIG. 7) until the antenna item is found that matches the antenna where the chip was just expired.

In accordance with some embodiments, the following procedure may be performed on the antenna item, which eliminates antenna items that represent transient chip acquisitions (e.g. the chip passed over the antenna only momentarily): (i) the chip expire time is set to the current time; (ii) the total duration the chip was on the antenna is calculated (expire time−acquire time); and (iii) if the duration <the configured transient milliseconds, the item is removed from the list.

In accordance with some embodiments, when a chip is on a shared antenna, it's association to a player position is inferred by examining the chip history for the chip to determine which player position the chip was on prior to being on the shared position. The following procedure may be used to accomplish this: (i) if there are no positions in the history, then the chip is not tagged to or associated with a player position; (ii) otherwise: (a) initialize an "index" variable to 0; (b) initialize a "found shared position" flag to false (this will be used to indicate that the shared position containing the shared antenna has been located in the position history list.); and (iii) iterate over the positions in the history from most recent to earliest (right to left in the diagram of FIG. 7). For each position, if the "found shared position" flag is false, then: (i) if the current position in the list is the shared position, set the "found shared position" flag to true; (ii) otherwise ("found shared position" is true), if all of the antenna items in the position are expired (e.g. have their expired time defined, and are therefore not transient), or any non-expired antenna items would not be considered transient if they were expired at the current time; and the position is a player position; then the chip is tagged to this player position. If the iteration completes without finding a player position that meets the above criteria, then the chip is not tagged to or associated with a player position.

It should be noted that the association between a chip and a player position, which may be represented by a chip history as described above and illustrated in FIG. 7, may in some embodiments be cleared by removing expired position items from the chip history. Expired position items are those that contain only expired antenna items. Removing position items that have non-expired antenna items will leave the chip history in a state that does not accurately reflect the current state of the chips on the table. In some embodiments, the system may be configured to purge the chip history of a given chip after each game so that any association with player positions is cleared for the next game. In other embodiments, once bets are paid on particular player positions/antennas, there is no need to clear the position history of the chips (i.e., no need to clear the chips as being associated with a particular antenna) prior to paying another bet. For example, in some embodiments the system may be programmed to selectively ignore the chips that are on a particular player position/antenna so that additional bets can be paid without requiring that the dealer remove the prior bets.

It should be noted that the above-described methodology of associating RFID-enabled chips with a particular player and/or player position may be useful in a variety of circumstances and play options and is not limited to embodiments involving shared betting areas and/or re-characterization bets. For example, as described herein, in some embodiments the integration of a card reading shoe and the RFID-enabled electronic capture of bet data may allow for the detection of overpays, underpays and cheating as the system tracks and records game outcomes and how each hand was bet. Anomalies detected based on such data may be communicated (or otherwise indicated) to dealers (e.g. with displays embedded in the table) and/or to supervisors, surveillance and management through a computer or other device including e.g. desktop computers, laptops, tablets and smartphone. As described herein, such bet data may be captured using multiple RFID antennas and decisions may be dynamically made by the system based on chip movements. For example, in some embodiments, every available bet is associated with one or more antennas and the player position chips are associated with may be determined by where the chips were prior to their final location (e.g. ties, pairs, re-characterization bets (made with and without use of lammers or tokens), etc.).

It should be noted that using a chip's position history to infer the association of a chip to a player position is not the only reasonable approach to achieving a desired objective of associating a chip with a given player position. An alternate approach may comprise tagging a chip with a player position every time it is acquired on a player position and replacing the association whenever the chip is acquired on a different player position. Such association between chip and player position could be many-to-one (where a single player position is stored for each chip), or many-to-many (where a list of player positions is stored for each chip, similar to the prior description but without any antenna history items). However, the approach described in detail above with respect to FIG. 7 has an additional benefit of providing a more complete history, which may have additional uses beyond just associating player positions to chips.

Back-Betting and Distinguishing Multiple Bets

The bet re-characterization concepts may also be extended to "back-betting" patrons (those not sitting at the table, but wagering from behind, perhaps by riding along on a seated player's bet). Such patrons might be given separate RFID betting circles on an electronic table, or one of the dealers may be assigned just to back bettors. Still other techniques may be used as desired. The presence of back bettors may give rise to the CPU 684 having to impute a number of active bettors at the table based on a number of distinct stacks, relative location of stacks, weight sensors, placement of tokens, and the like. Back-bettors may or may not want to accept the re-characterization of the player in front of them. So, in some embodiments, back-bettors may be given their own tokens. Or, back-bettors might use a token that toggles "on" or "off" whether or not a seated player's re-characterization applies to their bet or not, or even may indicate so verbally.

In some embodiments, CPU 684 may impute or determine that a plurality of different bets are placed within a single "circle" or area of the table. Whether placed by two different bettors (e.g., a seated bettor and a back-bettor) or a single better (e.g., a split re-characterization as described above), the system may determine that at least two distinct bets (stacks of chips) are placed by (i) determining, via one or more RFID interrogators or antennae, that there are a plurality of RFID-enabled tokens within the circle or area; and/or (ii) determining, through an optical camera, that a plurality of stacks are placed. Through a combination of such RFID and optical technology, it is even possible that the system may determine specific wager amounts associated with each stack.

In some embodiments, in-casino betting of live table games may be facilitated using an computing device such as one or more tablet computer(s), laptop(s), desktop computer (s) and/or smart phone(s). In some embodiments, such devices may be physically attached to chairs, in cabinets, walls, podiums, etc. Allowing a remote player to join a live table game may comprise adding a virtual player position to the table via use of one or more such computing devices. It should be noted that remote (e.g. Internet) betting on one or more live table games may be facilitated on any computing device outside the casino such as mobile phones, home computers, laptops, etc., in accordance with the embodiments described herein. In accordance with some embodiments, tablets and/or other devices may be automatically configured (e.g. depending on game type) to accurately reflect available betting options associated with a given physical gaming table.

In accordance with some embodiments, alerts and game location services may be provided to assist players in finding tables/games based on trend criteria, wager criteria or number of bettors criteria, and a player may connect to any game he so chooses.

In some embodiments, tables and remote bet positions (e.g. tablets) may be remotely observed and monitored in real time from anywhere in areas such as in surveillance rooms, executive and host offices and on mobile devices such as tablets and smart phones (e.g. in order to ensure wager and/or payout compliance, as described herein above).

As an additional measure to protect the gaming establishment profits, the CPU 684 may track all the cards that have been played from a shoe. If the computational requirements are particularly heavy, a portion of the cards may be tracked. Alternatively, the discarded cards may be calculated into the current adjusted odds, but offset by one or more hands. For example, at hand ten, the cards from hands one through eight may be evaluated, and at hand eleven, the cards from hands one through nine are evaluated, and so on. In the rare situation where a shoe has a strange distribution of cards, certain re-characterized wagers, such as "Press" may have lower adjusted odds so that a card counter cannot take undue advantage of the odd shoe.

Managing Volatility

In accordance with some embodiments, there may be a cap or ceiling for payouts. The cap may be a fixed amount or relative to the initial wager (no re-characterized bet may pay more than 500:1 compared to the original wager), per player, or per table (e.g., aggregating the net potential payouts of multiple bets by a player or table for the various possible outcomes). In some embodiments, if a player re-characterizes his bet, and doing so would result in a win that surpasses a table's maximum bet or maximum payout, the excess may be returned to the player before the bet is booked. For example, if a player with a large bet uses a "Switch" token when he is behind, the resulting payout might break the cap. Accordingly, a portion of the player's bet maybe taken down such that it is not "wasted".

In some embodiments, if a player's bet or payout surpasses a predetermined limit, the house may institute a larger edge. In one embodiment, the house edge may scale as bet or payout amounts surpass such limits. In this manner, the house can attempt to insulate itself from the high volatility of extremely large bets.

Thus, the house edge used in calculating an adjusted payout amount may vary based on various particular factors. In one embodiment, an operator may simply adjust the house edge value (e.g., from 2.5% to 3.1%) when desired (e.g., using a central server). In another embodiment, the house edge may be dependent on the current date/time, business of the gaming floor, a player rating, or the like. As described above, the house edge may be increased for re-characterizations spanning numerous hands. Also, the house edge may be dependent upon an amount bet, as above. Further, the system may dynamically modify the house edge based on wagering trends associated with one or more tables (e.g., "Banker" has won 3 in a row, so the system expects that wagering will now be heavily weighted toward "Player" and can take a higher house edge on the bets).

The monitors 370 may list certain re-characterization bets as not available. This may be done as a function of time (e.g., a press bet is not available after 9 PM); as a function of cards already dealt (e.g., a player cannot take Quick 6 when he already has a 6); or to prevent bets that are grossly unappealing (e.g., a player bet $500 and the payout is $10). Still other reasons for showing a bet as not available exist such as player rating, wager size, or the like. For example, wagering trend information can also be used to enable/disable certain special bets (e.g., if wagers are above a predetermined threshold on the "Banker" side at a table, no more bets may be placed on this side). The decision to enable/disable a certain re-characterization, or to enforce various betting limits associated with such bets, can be supported by input from the pit boss (or via a dealer screen with a password). For example, the pit boss would have access to the maximum casino exposure, expected exposure, etc., and override a table lockout to allow additional betting at a particular house edge. In essence, the pit boss may have a real-time decision tool to allow layers of increased volatility in exchange for increased value (house edge). Personalized player monitors may indicate that only limited wagering will be allowed on certain bets, so players must put in their bets quickly or lose out on the opportunity. For disabled bets, if the opposing side of the bet receives more wagers, then the disabled bet may be made available. The monitors may list payouts in gross form or net form as desired. Players may be informed of how the monitors are programmed. Note that with net payouts, some payouts may appear negative.

In one embodiment, player status may influence the house's willingness to accept a large bet. For example, a highly-rated player may be allowed up book bets up to a larger maximum, may be paid at a lower house edge on amounts over the maximum, etc.

In some embodiments or situations, a casino may only wish to pay out a certain amount for every hand wager (e.g. a "maximum payout). Since traditional baccarat has but two main outcomes, (i.e. player and banker), the max payout may be determined to be the net amount between player and banker bets paid to players. Once the net amount between the bets (i.e. the differential) exceeds a preset level, the system (e.g. the table computer) may pause game play and notify the dealer (e.g. audibly and/or visually via a display).

In some embodiments, the casino may realize a configurable house advantage by, e.g.: (i) payout odds: as the payout odds change the house advantage changes accordingly to reflect the risk of offering the bet proposition; (ii) size of bet: as the player's wager size changes so may the advantage. For example, as the player wagers larger sums, the house advantage can go up or down, and in most cases, the advantage will go down (discount for buying in bulk); (iii) player ranking: for the higher ranked players (platinum, gold, etc.) the advantage can go down as a discount; (iv) trend; as the trend gets longer (multiple of the same bet winning in a row) the table is more likely to attract more wagering, which increases the risk for the casino. In this case the house advantages can go up as the trends get longer to offset the casino's risk.

Other Games

While the present disclosure has focused on baccarat, and to a lesser extent on blackjack, it should be appreciated that the concepts disclosed herein may be applied to mini-baccarat tables, craps tables, roulette tables, Sic Bo, Pai Gow, and other games of chance. The invention can even be applied to slot machines. For example, after less than all of the reels have completed spinning, they may stop an offer the player a chance to re-characterize his original bet. For example, if a player can be thought of as betting on "any win" when he spins the reels, after two of five reels have spun, he can re-characterize to "No Winner," and be paid an adjusted rate if his outcome is not a winner. The invention might apply to video poker in the same manner.

It should also be noted that while chip tracking and associating player positions with particular chips has mainly been described herein in an intra-table environment, in some embodiments the methodologies and systems described herein may be applied to a multi-table environment such that chip position is tracked and recognized across multiple tables.

Rules of Interpretation & General Definitions

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, LDP, rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as standard definition (SDTV), enhanced definition (EDTV), high definition (HD), or the like. The information may likewise be static, in which case, painted glass may be used to form the display. Note that static information may be presented on a display capable of displaying dynamic information if desired.

The present disclosure frequently refers to a "control system". A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, CPU devices, computing devices, microcontrollers, digital signal processors, or like devices. Exemplary processors are the INTEL PENTIUM or AMD ATHLON processors.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein.

Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, Local Area Network (LAN), Wide Area Network (WAN), or Ethernet (or IEEE 802.3), Token Ring, or via any appropriate communications means or combination of communications means. Exemplary protocols include but are not limited to: BLUETOOTH™, TDMA, CDMA, GSM, EDGE, GPRS, WCDMA, AMPS, D-AMPS, IEEE 802.11 (WI-FI), IEEE 802.3, SAP, SAS™ by IGT, SUPERSAS™, OASIS™ by Aristocrat Technologies, SDS by Bally Gaming and Systems, ATP, TCP/IP, gaming device standard (GDS) published by the Gaming Standards Association of Fremont Calif., the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cellular networks, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The present disclosure provides, to one of ordinary skill in the art, an enabling description of several embodiments and/or inventions. Some of these embodiments and/or inventions may not be claimed in the present disclosure, but may nevertheless be claimed in one or more continuing applications that claim the benefit of priority of the present disclosure.

What is claimed is:

1. A system for facilitating a card game, comprising:

a table, the table having positioned thereon a first antenna associated with a dealer position of the table;

at least one second antenna associated with a first player position of the table; and at least one third antenna associated with a second player position of the table, wherein each of the first, second and third antennas is operable to determine an RFID-enabled chip within a predetermined range of the respective antenna;

a processor that is a component of the table and is operable to communicate with each of the first, second and third antennas; and a memory of the table that is accessible to the processor, the memory storing (i) information about RFID-enabled chips used on the table for a card game; and (ii) a program, wherein the processor is operable with the program to:

receive an indication that an RFID-enabled chip has been acquired at one of the second or third antennas, the indication including an identifier of the antenna that acquired the RFID-enabled chip and a unique identifier of the RFID-enabled chip, thereby determining a specific RFID-enabled chip and an acquiring antenna;

determine a player identifier associated with the specific RFID-enabled chip;

determine a period of time during which the RFID-enabled chip has been located within a predetermined range of the acquiring antenna;

determine whether the specific RFID-enabled chip has been located within the predetermined range of the acquiring antenna for a period of time that is not less than a predetermined minimum period of time by comparing the period of time to the predetermined minimum period of time;

store in the memory the unique identifier of the specific RFID-enabled chip in association with the identifier of the acquiring antenna, thereby associating the specific RFID-enabled chip with the player position associated with the acquiring antenna; and register a wager for the player identifier based on the specific RFID-enabled chip only if it is determined that the specific RFID-enabled chip has been located within a predetermined range of the acquiring antenna for a period of time that is not less than the predetermined minimum period of time.

2. The system of claim 1, the table further comprising:

at least one fourth antenna associated with a shared player position, the shared player position for placement of chips previously associated with either or both the first player position and the second player position.

3. The system of claim 2, wherein the processor is further operable with the program to:

receive an indication that the specific RFID-enabled chip has been acquired at the fourth antenna;

retrieve from the memory, based on the unique chip identifier of the specific RFID-enabled chip, a position history associated with the specific RFID-enabled chip, wherein the position history stores, for the specific RFID-enabled chip, an indication of player positions the specific RFID-enabled chip has been associated with during a current game by storing, in association with the unique identifier of the RFID-enabled chip, an identifier of each antenna that acquired the specific RFID-enabled chip and a time at which the specific RFID-enabled chip was acquired by the antenna;

determine a most recent player position associated with the specific RFID-enabled chip; and register a wager for the most recent player position associated with the specific RFID-enabled chip based on the specific RFID-enabled chip and the position history.

4. The system of claim 3, further comprising:

a monitor associated with the dealer position, the monitor for displaying to the dealer wagers placed on the table, wherein the processor is further operable with the program to:

display on the monitor the wager registered for the most recent player position.

5. The system of claim 3, wherein the processor is further operable with the program to:

receive, after a predetermined point in a game, an indication that a second RFID-enabled chip has been acquired at the fourth antenna, the indication including an identifier of the acquiring antenna and a unique identifier of the second RFID-enabled chip, thereby determining a second acquiring antenna and a second specific RFID-enabled chip;

retrieve from the memory, based on the unique chip identifier, a position history associated with the second specific RFID-enabled chip, wherein the position history stores, for the specific RFID-enabled chip, an indication of player positions with which the second specific RFID-enabled chip has been associated during a current game by storing, in association with the unique identifier of the second specific RFID-enabled chip, an identifier of each antenna that acquired the second specific RFID-enabled chip and a time at which the second specific RFID-enabled chip was acquired by the antenna;

determine a most recent player position with which the second specific RFID-enabled chip has been associated;

determine a currently outstanding wager previously registered with the most recent player position;

recognize a re-characterization wager for the most recent player position based on the previously registered wager and the indication of the second RFID-enabled chip; and register the re-characterization wager for the player position.

6. The system of claim 1, further comprising:

a monitor associated with the dealer position, the monitor for displaying to the dealer wagers placed on the table, wherein the processor is further operable with the program to:

display on the monitor the wager registered for the player position.

7. The system of claim 1, wherein the processor is further operable with the program to:

receive, after a predetermined point in a game, an indication that a second RFID-enabled chip has been acquired at one of the second antenna or the third antenna, the indication including an identifier of the acquiring antenna and a unique identifier of the second RFID-enabled chip, thereby determining a second acquiring antenna and a second specific RFID-enabled chip;

determine the player position associated with the second acquiring antenna;

determine a previously registered wager associated with the determined player position associated with the second acquiring antenna for the current game;

recognize a re-characterization wager for the player position based on the previously registered wager and the indication of the second RFID-enabled chip; and register the re-characterization wager for the player position.

8. The system of claim 1, wherein the processor is further operable with the program to:

receive an indication from one of the second antenna and the third antenna that the specific RFID-enabled chip is no longer located within a predetermined range of the one of the second antenna and the third antenna, the indication including an identifier of the one of the second antenna and the third antenna providing the indication and the unique identifier of the specific RFID-enabled chip; and update, in the memory, a position history associated with the specific RFID-enabled chip, wherein the position history stores, for the specific RFID-enabled chip, an indication of player positions the specific RFID-enabled chip has been associated with during a current game by storing, in association with the unique identifier of the specific RFID-enabled chip, an identifier of each antenna that acquired the specific RFID-enabled chip and a time at which the specific RFID-enabled chip was acquired by the one of the second antenna and the third antenna.

9. The system of claim 1, wherein the processor is further operable with the program to:

remove an indication of the acquiring antenna from a position history associated with the specific RFID-enabled chip if it is determined that the specific RFID-enabled chip has not been located within the predetermined range of the acquiring antenna for the period of time that is not less than the predetermined minimum period of time.

10. The system of claim 1, wherein the processor is further operable with the program to:

determine an end of a current game; and clear a position history associated with the specific RFID-enabled chip from the memory.

11. The system of claim 1, wherein the processor is further operable with the program to:

determine a time at which the RFID-enabled chip was acquired at the acquiring antenna, thereby determining an acquisition time;

store in the memory an indication of the RFID-enabled chip having been acquired at the acquiring antenna and the acquisition time;

determine a time at which the RFID-enabled chip is determined to no longer be within a predetermined range of the acquiring antenna, thereby determining an expiration time;

store in the memory an indication of the expiration time;

wherein the processor being operable with the program to determine whether the specific RFID-enabled chip has been located within a predetermined range of the acquiring antenna for a period of time that is not less than a predetermined minimum period of time comprises calculating the time between the acquisition time and the expiration time; and wherein the processor being operable with the program to register a wager comprises the processor being operable with the program to perform one of:

(i) register a wager for the player identifier based on the specific RFID-enabled Chip only if it is determined that the specific RFID-enabled chip has been located within a predetermined range of the acquiring antenna for a period of time that is not less than a predetermined minimum period of time, (ii) otherwise modify the memory to indicate that the RFID-enabled chip was not within the predetermined range of the acquiring antenna for the period of time that is not less than the predetermined minimum period of time.

12. A non-transitory computer-readable medium storing instructions for execution by a processor that is a component of a table for facilitating a card game, the instructions causing the processor to perform a method comprising:

receiving an indication that an RFID-enabled chip has been acquired at one of a first antenna or a second antenna, the indication including an identifier of the antenna that acquired the RFID-enabled chip and a unique identifier of the RFID-enabled chip, thereby determining a specific RFID-enabled chip and an acquiring antenna, wherein the first antenna comprises an antenna associated with a first player position of a table operable to facilitate a card game and the second antenna comprises an antenna associated with a second player position of the table;

determining a player identifier associated with the specific RFID-enabled chip;

determining a period of time during which the RFID-enabled chip has been located within a predetermined range of the acquiring antenna;

determine whether the specific RFID-enabled chip has been located within a predetermined range of the acquiring antenna for a period of time that is not less than a predetermined minimum period of time by comparing the period of time to the predetermined minimum period of time;

storing in the memory the unique identifier of the specific RFID-enabled chip in association with the identifier of the acquiring antenna, thereby associating the specific RFID-enabled chip with the player position associated with the acquiring antenna; and registering a wager for the player identifier based on the specific RFID-enabled chip only if it is determined that the specific RFID-enabled chip has been located within a predetermined range of the acquiring antenna for a period of time that is not less than the predetermined minimum period of time.

13. The non-transitory computer-readable medium of claim 12, wherein the method further comprises:

receiving an indication that the specific RFID-enabled chip has been acquired at a third antenna of the table, the third antenna being associated with a shared player position, the shared player position for placement of chips previously associated with either or both the first player position and the second player position;

retrieving from the memory, based on the unique chip identifier of the specific RFID-enabled chip, a position history associated with the specific RFID-enabled chip, wherein the position history stores, for the specific RFID-enabled chip, an indication of player positions the specific RFID-enabled chip has been associated with during a current game by storing, in association with the unique identifier of the RFID-enabled chip, an identifier of each antenna that acquired the specific RFID-enabled chip and a time at which the specific RFID-enabled chip was acquired by the antenna;

determining a most recent player position associated with the specific RFID-enabled chip; and registering a wager for the most recent player position associated with the specific RFID-enabled chip based on the specific RFID-enabled chip and the position history.

14. The non-transitory computer-readable medium of claim 12, wherein the method further comprises:

receiving, after a predetermined point in a game, an indication that a second RFID-enabled chip has been acquired at the third antenna, the indication including an identifier of the acquiring antenna and a unique identifier of the second RFID-enabled chip, thereby determining a second acquiring antenna and a second specific RFID-enabled chip;

retrieving from the memory, based on the unique chip identifier, a position history associated with the second specific RFID-enabled chip, wherein the position history stores, for the specific RFID-enabled chip, an indication of player positions with which the second specific RFID-enabled chip has been associated during a current game by storing, in association with the unique identifier of the second specific RFID-enabled chip, an identifier of each antenna that acquired the second specific RFID-enabled chip and a time at which the second specific RFID-enabled chip was acquired by the antenna;

determining a most recent player position with which the second specific RFID-enabled chip has been associated;

determining a currently outstanding wager previously registered with the most recent player position;

determining a re-characterization wager for the most recent player position based on the previously registered wager and the indication of the second RFID-enabled chip; and registering the re-characterization wager for the player position.

15. The non-transitory computer-readable medium of claim 12, wherein the method further comprises:

receiving an indication from one of the first antenna and the second antenna that the specific RFID-enabled chip is no longer located within a predetermined range of the one of the second antenna and the third antenna, the indication including an identifier of the one of the second antenna and the third antenna providing the indication and the unique identifier of the specific RFID-enabled chip; and updating, in the memory, a position history associated with the specific RFID-enabled chip, wherein the position history stores, for the specific RFID-enabled chip, an indication of player positions the specific RFID-enabled chip has been associated with during a current game by storing, in association with the unique identifier of the specific RFID-enabled chip, an identifier of each antenna that acquired the specific RFID-enabled chip and a time at which the specific RFID-enabled chip was acquired by the one of the second antenna and the third antenna.

16. The non-transitory computer-readable medium of claim 12, wherein the method further comprises:

removing an indication of the acquiring antenna from a position history associated with the specific RFID-enabled chip if it is determined that the specific RFID-enabled chip has not been located within the predetermined range of the acquiring antenna for the period of time that is not less than the predetermined minimum period of time.

17. The non-transitory computer-readable medium of claim 12, wherein the method further comprises:

removing an indication of the acquiring antenna from a position history associated with the specific RFID-enabled chip if it is determined that the specific RFID-enabled chip has not been located within the predetermined range of the acquiring antenna for the period of time that is not less than the predetermined minimum period of time.

18. The non-transitory computer-readable medium of claim 12, wherein the method further comprises:

determining a time at which the RFID-enabled chip was acquired at the acquiring antenna, thereby determining an acquisition time;

storing in the memory an indication of the RFID-enabled chip having been acquired at the acquiring antenna and the acquisition time;

determining a time at which the RFID-enabled chip is determined to no longer be within a predetermined range of the acquiring antenna, thereby determining an expiration time;

storing in the memory an indication of the expiration time;

wherein determining whether the specific RFID-enabled chip has been located within a predetermined range of the acquiring antenna for a period of time that is not less than a predetermined minimum period of time comprises calculating the time between the acquisition time and the expiration time; and wherein registering a wager comprises performing one of:

(i) registering a wager for the player identifier based on the specific RFID-enabled chip only if it is determined that the specific RFID-enabled chip has been located within a predetermined range of the acquiring antenna for a period of time that is not less than a predetermined minimum period of time, (ii) otherwise modifying the memory to indicate that the RFID-enabled chip was not within the predetermined range of the acquiring antenna for the period of time that is not less than the predetermined minimum period of time.

19. A non-transitory computer-readable medium storing instructions for execution by a processor that is a component of a table for facilitating a card game, the instructions causing the processor to perform a method comprising:

receiving an indication that an RFID-enabled chip has been acquired at one of a first antenna or a second antenna, the indication including an identifier of the antenna that acquired the RFID-enabled chip and a unique identifier of the RFID-enabled chip, thereby determining a specific RFID-enabled chip and an acquiring antenna, wherein the first antenna comprises an antenna associated with a first player position of a table operable to facilitate a card game and the second antenna comprises an antenna associated with a second player position of the table;

determining a player identifier associated with the specific RFID-enabled chip;

determining a duration of time during which the RFID-enabled chip has been located within a predetermined range of the acquiring antenna by:

determining a first time associated with the specific RFID-enabled chip, the first time comprising a time at which the specific RFID-enabled chip has acquired by the acquiring antenna;

determining a second time associated with the specific RFID-enabled chip, the second time comprising a time at which the specific RFID-enabled chip has been removed from a vicinity of the acquiring antenna; and determining the duration of time for which the specific RFID-enabled chip has been located within a detection range of the acquiring antenna by determining a difference between the first time and the second time;

determining whether the duration comprises a period of time that is at least equal to a minimum period of time;

registering in the memory the unique identifier of the specific RFID-enabled chip in association with the identifier of the acquiring antenna, thereby associating the specific RFID-enabled chip with the player position associated with the acquiring antenna; and registering a wager for the player identifier based on the specific RFID-enabled chip only if it is determined that the duration is a period of time that is at least equal to the predetermined minimum period of time.

* * * * *